United States Patent
Ma et al.

(10) Patent No.: US 9,075,226 B2
(45) Date of Patent: Jul. 7, 2015

(54) MULTI-STATE IMOD WITH RGB ABSORBERS

(75) Inventors: Jian J. Ma, Carlsbad, CA (US); Tallis Young Chang, San Diego, CA (US); John Hyunchul Hong, San Clemente, CA (US); Chong Uk Lee, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 193 days.

(21) Appl. No.: 13/441,553

(22) Filed: Apr. 6, 2012

(65) Prior Publication Data

US 2013/0265216 A1    Oct. 10, 2013

(51) Int. Cl.
*G02B 26/00* (2006.01)

(52) U.S. Cl.
CPC .................................... *G02B 26/001* (2013.01)

(58) Field of Classification Search
CPC .......... G02B 26/00; G02B 26/08; B81B 7/02; B81C 5/00; G09G 3/34; G02F 1/03
USPC ............ 359/224, 254, 290, 291; 345/85, 108, 345/204; 703/6
See application file for complete search history.

(56) References Cited

U.S. PATENT DOCUMENTS

| | | | |
|---|---|---|---|
| 7,273,282 | B2 | 9/2007 | Przybyla et al. |
| 7,848,003 | B2 | 12/2010 | Kothari et al. |
| 7,955,586 | B2 | 6/2011 | Jung et al. |
| 2006/0067600 | A1 | 3/2006 | Gally et al. |
| 2006/0077153 | A1* | 4/2006 | Cummings et al. ............. 345/85 |
| 2006/0103643 | A1 | 5/2006 | Mathew et al. |
| 2008/0013145 | A1* | 1/2008 | Chui et al. ...................... 359/224 |
| 2008/0288225 | A1* | 11/2008 | Djordjev ............................ 703/6 |
| 2009/0059346 | A1 | 3/2009 | Xu |
| 2009/0147343 | A1* | 6/2009 | Kogut et al. ................... 359/254 |
| 2009/0225395 | A1* | 9/2009 | Ganti et al. .................... 359/291 |
| 2009/0244686 | A1* | 10/2009 | Djordjev ....................... 359/290 |
| 2010/0214642 | A1* | 8/2010 | Miles ............................ 359/290 |
| 2011/0075245 | A1* | 3/2011 | Hashimura et al. ........... 359/291 |
| 2011/0193770 | A1 | 8/2011 | Gally et al. |

OTHER PUBLICATIONS

International Search Report and Written Opinion—PCT/US2013/034401—ISA/EPO—Jul. 2, 2013.
Kelly K. L. et al., "The Optical Properties of Metal Nanoparticles: The Influence of Size, Shape, and Dielectric Environment"; J. Phys. Chem. B., 2003, 107, 668-677.
Taiwan Search Report—TW102111932—TIPO—Sep. 29, 2014.
Taiwan Office Action—TW102111932—TIPO—Sep. 30, 2014.

* cited by examiner

*Primary Examiner* — Lun-Yi Lao
*Assistant Examiner* — Johny Lau
(74) *Attorney, Agent, or Firm* — Weaver Austin Villeneuve & Sampson

(57) ABSTRACT

A display apparatus may include a multi-state IMOD, such as an analog IMOD (AIMOD), a 3-state IMOD (such as having a white state, a black state and one colored state) or a 5-state IMOD (such as having a white state, a black state and three colored states). The multi-state IMOD may include a movable reflective layer and an absorber stack. The absorber stack may include a first absorber layer having a first absorption coefficient and a first absorption peak at a first wavelength, a second absorber layer having a second absorption coefficient and a second absorption peak at a second wavelength, and a third absorber layer having a third absorption coefficient and a third absorption peak at a third wavelength. The first, second and third absorption layers may have absorption levels that drop to nearly zero at the center of each neighboring absorber layer's absorption peak.

29 Claims, 16 Drawing Sheets

Common Voltages

| | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| Segment Voltages | $VS_H$ | Stable | Stable | Relax | Stable | Actuate |
| | $VS_L$ | Actuate | Stable | Relax | Stable | Stable |

RED

GREEN

BLUE

BLACK

WHITE

MULTI-STATE IMOD WITH RGB ABSORBERS

TECHNICAL FIELD

This disclosure relates to display devices, including but not limited to display devices that incorporate electromechanical systems.

DESCRIPTION OF THE RELATED TECHNOLOGY

Electromechanical systems (EMS) include devices having electrical and mechanical elements, actuators, transducers, sensors, optical components (including mirrors) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities.

In a multi-state IMOD, such as an analog IMOD (AIMOD), a pixel's reflective color is determined by the gap spacing between a thin absorber layer and a mirrored surface. As the absorber is moved closer to the mirror (or vice versa), the reflected color turns red, then green, and then blue, then black where the colors across the visible spectrum are absorbed nearly uniformly.

The white state of a multi-state IMOD occurs when the absorber layer is located at the minimum field intensity of the light. However, because the minimum field intensity (the standing wave) of different wavelengths does not spatially overlap, the color of the white state produced by the multi-state IMOD is shifted depending on the location of the absorbing layer. For example, when the location of the absorber corresponds with the null of a green wavelength, the reflected green color is reinforced. Therefore, the white-state color will be tinted with green. It would be desirable to provide improved methods and devices for achieving a white-state color.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus. The display apparatus may include a multi-state IMOD, such as an analog IMOD (AIMOD), 3-state IMOD (having a white state, a black state and one colored state) or a 5-state IMOD (having a white state, a black state and three colored states). The multi-state IMOD may include a movable reflective layer and an absorber stack. The absorber stack may include a first absorber layer having a first absorption coefficient and a first absorption peak at a first wavelength, a second absorber layer having a second absorption coefficient and a second absorption peak at a second wavelength, and a third absorber layer having a third absorption coefficient and a third absorption peak at a third wavelength. The first, second and third absorption layers may have absorption levels that drop to nearly zero at the center of each neighboring absorber layer's absorption peak.

Another innovative aspect of the subject matter described in this disclosure can be implemented in an apparatus that includes a multi-state interferometric modulator (IMOD). The multi-state IMOD may, for example, be a 3-state IMOD, 5-state IMOD or an analog IMOD. The multi-state IMOD may include a movable reflective layer and an absorber layer stack. The absorber layer stack may include a first absorber layer having a first absorption coefficient and a first absorption peak at a first wavelength of light, a second absorber layer having a second absorption coefficient and a second absorption peak at a second wavelength of light, and a third absorber layer having a third absorption coefficient and a third absorption peak at a third wavelength of light. The first, second and third absorption layers may have absorption levels that drop to nearly zero at the center of at least one neighboring absorber layer's absorption peak.

The first absorber layer may be disposed at a first position corresponding to a null for the first wavelength of light that coincides with the first absorption peak. The second absorber layer may be disposed at a second position corresponding to a null for the second wavelength of light that coincides with the second absorption peak. The third absorber layer may be disposed at a third position corresponding to a null for the third wavelength of light that coincides with the third absorption peak. The nulls for the first, second and third wavelengths of light may correspond to a resulting interference standing wave field intensity distribution when the movable reflective layer is actuated to a white state.

The first wavelength may be shorter than the second wavelength and the second wavelength may be shorter than the third wavelength. For example, the first wavelength may correspond to a blue color, the second wavelength may correspond to a green color and the third wavelength may correspond to a red color.

In some implementations, the first absorber layer, the second absorber layer and/or the third absorber layer may be formed of a metal nanoparticle thin film. The absorber stack may include a first substantially transparent layer disposed between the first absorber layer and the second absorber layer. The absorber stack may include a second substantially transparent layer disposed between the second absorber layer and the third absorber layer.

In some implementations, the multi-state IMOD may be configured to achieve a white state when the movable reflective layer is positioned approximately 100 nm or more from the absorber stack. In alternative implementations, the multi-state IMOD may be configured to achieve a white state when the movable reflective layer is positioned about 10 nm from the absorber stack. The white state of the multi-state IMOD may be substantially similar to that of CIE Standard Illuminant D65.

Another innovative aspect of the subject matter described in this disclosure can be implemented in an apparatus that includes a multi-state IMOD. The multi-state IMOD may, for example, be a 3-state IMOD, 5-state IMOD or an analog IMOD. The multi-state IMOD may include a movable reflective layer and an absorber layer stack.

The absorber layer stack may include a first absorber layer disposed at a first position corresponding to a null for a first wavelength of light that coincides with a first absorption peak of the first absorber layer. The absorber layer stack may include a second absorber layer disposed at a second position corresponding to a null for a second wavelength of light that coincides with a second absorption peak of the second absorber layer. The absorber layer stack may include and a third absorber layer disposed at a third position corresponding to a null for a third wavelength of light that coincides with a third absorption peak of the third absorber layer.

The nulls for the first, second and third wavelengths of light may correspond to a resulting interference standing wave field intensity distribution when the movable reflective layer is actuated to a white state. The white state may be substantially similar to that of CIE Standard Illuminant D65. The first, second and third absorption layers have absorption levels that drop to nearly zero at the center of at least one neighboring absorber layer's absorption peak. In some implementations, the first absorber layer, the second absorber layer and/or the third absorber layer may be formed of a metal nanoparticle thin film.

The first wavelength may be shorter than the second wavelength and the second wavelength may be shorter than the third wavelength. For example, the first wavelength may correspond to a blue color, the second wavelength may correspond to a green color and the third wavelength may correspond to a red color.

Another innovative aspect of the subject matter described in this disclosure can be implemented in a method that involves disposing a first absorber layer at a first position corresponding to a null for a first wavelength of light that coincides with a first absorption peak of the first absorber layer. The method may involve disposing a second absorber layer at a second position corresponding to a null for a second wavelength of light that coincides with a second absorption peak of the second absorber layer. The method may involve disposing a third absorber layer at a third position corresponding to a null for a third wavelength of light that coincides with a third absorption peak of the third absorber layer.

The method may involve forming the first absorber layer, the second absorber layer and/or the third absorber layer of a metal nanoparticle thin film. In some implementations, each of the first, second and third absorber layers may have absorption levels that drop to nearly zero at the center of a neighboring absorber layer's absorption peak.

The nulls for the first, second and third wavelengths of light may correspond to a resulting interference standing wave field intensity distribution when the reflective layer is actuated to a white state. The first wavelength may be shorter than the second wavelength and the second wavelength may be shorter than the third wavelength.

The method may involve configuring a reflective layer for moving to various positions relative to the first, second and third absorber layers. For example, the reflective layer may be configured for moving to a least three positions relative to the first, second and third absorber layers.

The apparatus that includes the multi-state IMOD also may include a display and a processor that is configured to communicate with the display. The processor may be configured to process image data. The apparatus may include a memory device that is configured to communicate with the processor. The apparatus may include a driver circuit configured to send at least one signal to the display and a controller configured to send at least a portion of the image data to the driver circuit. The apparatus may include an image source module configured to send the image data to the processor. The image source module may include at least one of a receiver, transceiver, and transmitter. The apparatus may include an input device configured to receive input data and to communicate the input data to the processor.

Details of one or more implementations of the subject matter described in this specification are set forth in the accompanying drawings and the description below. Although the examples provided in this summary are primarily described in terms of MEMS-based displays, the concepts provided herein apply to other types of displays, such as organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
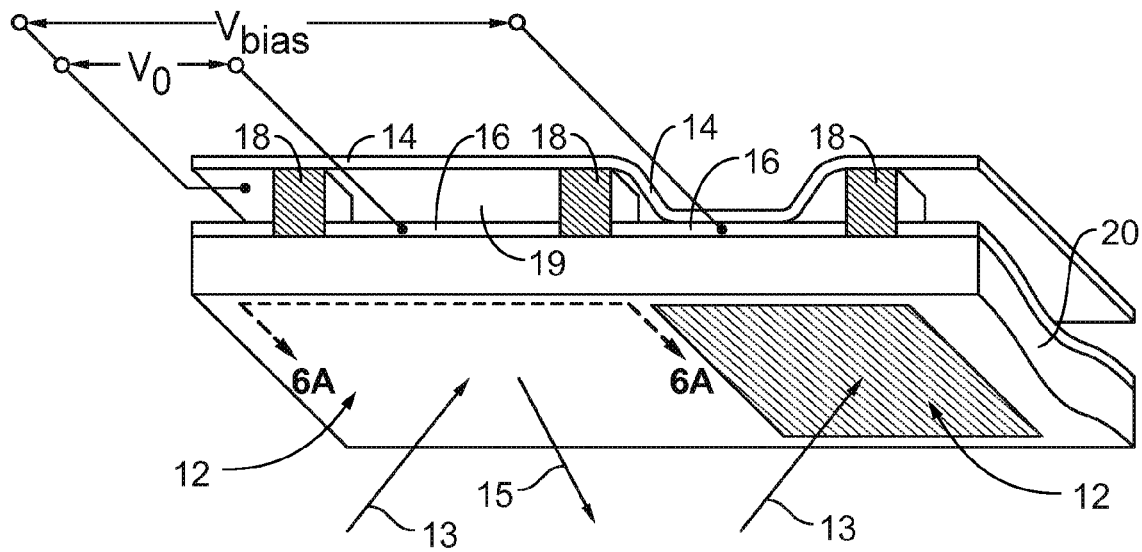
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

A multi-state IMOD may include a movable reflective layer and an absorber stack. The absorber stack may include a first absorber layer having a first absorption coefficient and a first absorption peak at a first wavelength, a second absorber layer having a second absorption coefficient and a second absorption peak at a second wavelength, and a third absorber layer having a third absorption coefficient and a third absorption peak at a third wavelength. The first, second and third absorption layers may have absorption levels that drop to nearly zero at the center of each neighboring absorber layer's absorption peak.

The absorber stack may be fabricated with a variety of methods and materials. In some implementations, the absorber layers may be fabricated via thin film deposition and doping with material (such as one or more metals) having a suitable red, green and blue extinction coefficient profile. In alternative implementations, the absorption spectrum property of the absorber layers may be controlled according to the size and shapes of the nanoparticles doped in the thin film, such as according to the ratio of the major axis to the minor axis of nanospheroids.

Particular implementations of the subject matter described in this disclosure can be implemented to realize one or more of the following potential advantages. Displays that include multi-state IMODs such as those described herein may be able to achieve a white state that is substantially similar to that of CIE Standard Illuminant D65. The improved white state may be achieved without using spatial and temporal dithering, and with little or no impact on luminance and spatial resolution. Moreover, the improved white state may be achieved with no additional processing or electric power.

Some multi-state IMODs described herein achieve a white state when an absorber stack is substantially adjacent to a mirror stack, with little or no gap between the absorber stack and the mirror stack. However, alternative implementations can achieve a white state with a larger air gap (such as a gap of 100 nm or more). In such implementations, the mirror may be relatively more mechanically stable. Problems such as stiction and charging induced by mirror pull-in may be reduced or prevented.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent IMODs 12 (i.e., IMOD pixels). In the IMOD 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near, adjacent or touching the optical stack 16. The voltage $V_{bias}$ applied across the IMOD 12 on the right is sufficient to move and can maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. A person having ordinary skill in the art will readily recognize that most of the light 13 incident upon the pixels 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, more electrically conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be approximately less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
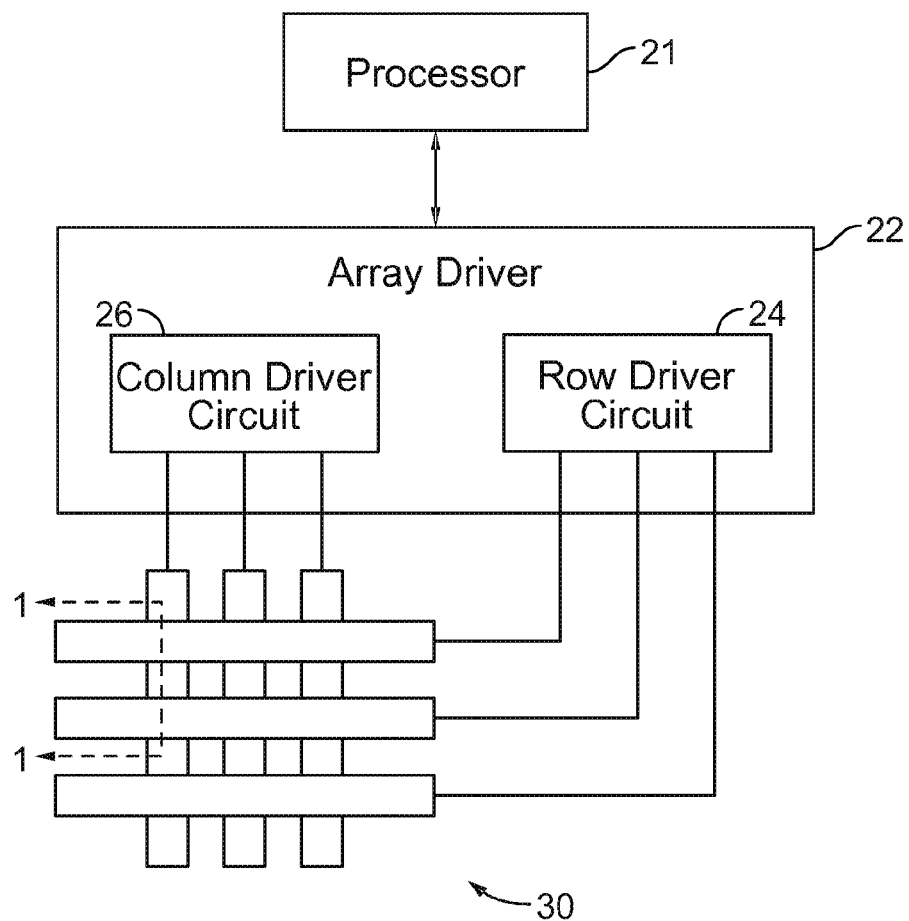
FIG. 2 shows an example of a system block diagram illustrating an electronic device incorporating a 3×3 IMOD display.

FIG. 2 shows an example of a system block diagram illustrating an electronic device incorporating a 3×3 IMOD display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
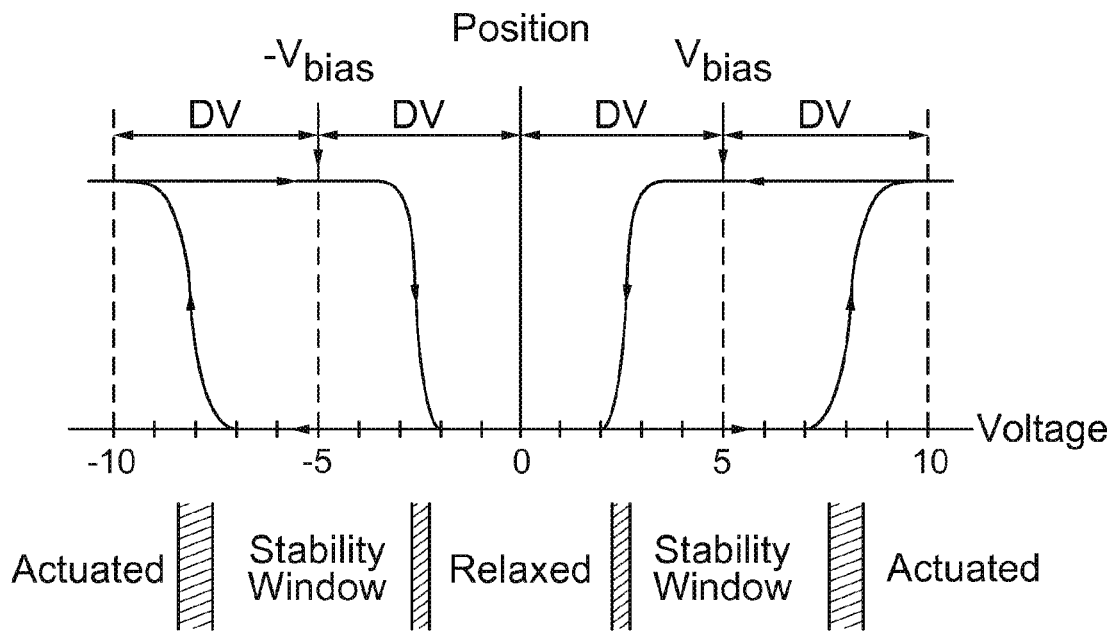
FIG. 3 shows an example of a diagram illustrating movable reflective layer position versus applied voltage for the IMOD of FIG. 1.
FIG. 4 shows an example of a table illustrating various states of an IMOD when various common and segment voltages are applied.

FIG. 3 shows an example of a diagram illustrating movable reflective layer position versus applied voltage for the IMOD of FIG. 1. For MEMS IMODs, the row/column (i.e., common/segment) write procedure may take advantage of a hysteresis property of these devices as illustrated in FIG. 3. An IMOD may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an IMOD when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all IMOD elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the IMOD will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
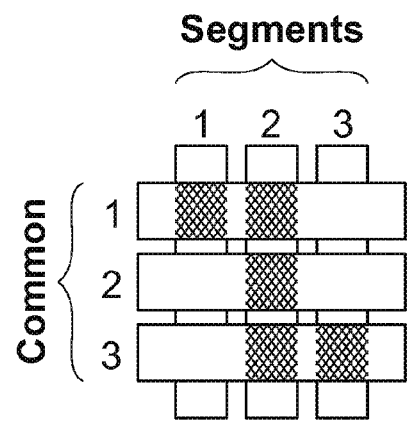
FIG. 5A shows an example of a diagram illustrating a frame of display data in the 3×3 IMOD display of FIG. 2.
Figure 5B:
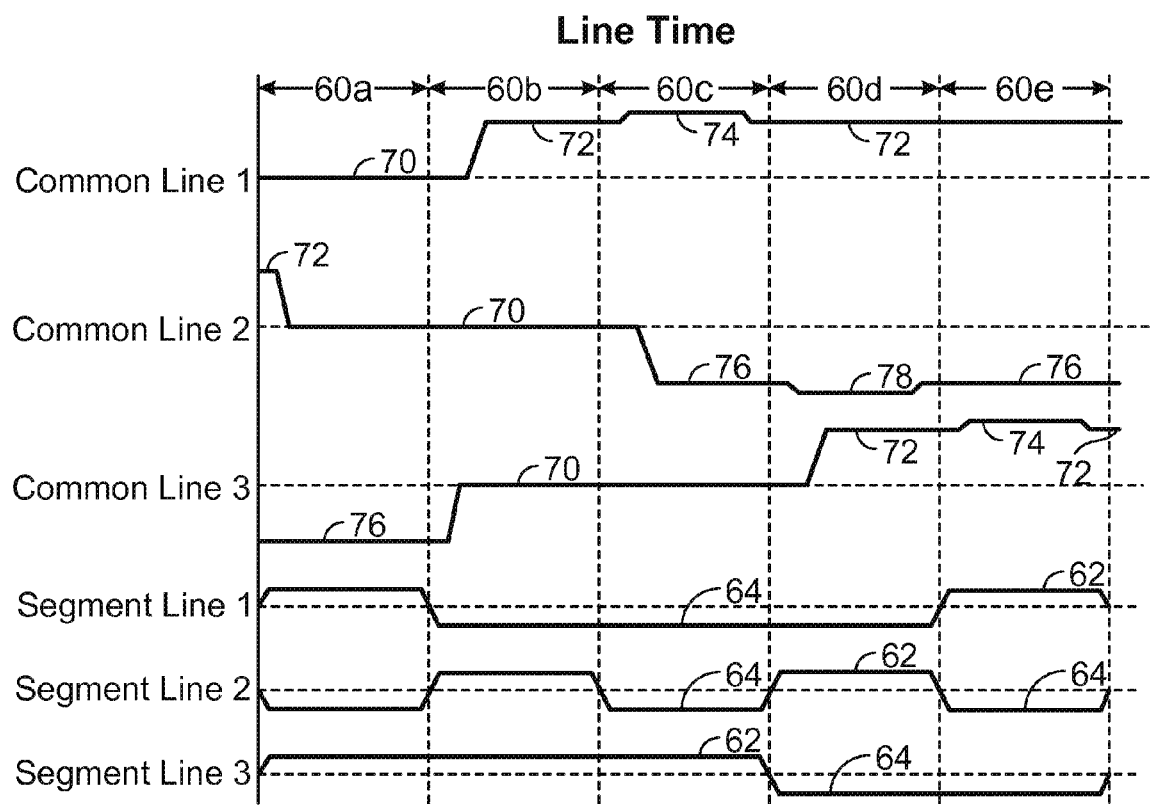
FIG. 5B shows an example of a timing diagram for common and segment signals that may be used to write the frame of display data illustrated in FIG. 5A.

FIG. 5A shows an example of a diagram illustrating a frame of display data in the 3×3 IMOD display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1, 2) and (1, 3) along common line 1 remain in a relaxed, or unactuated, state for the duration of the first line time 60a, the modulators (2, 1), (2, 2) and (2, 3) along common line 2 will move to a relaxed state, and the modulators (3, 1), (3, 2) and (3, 3) along common line 3 will remain in their previous state. With reference to FIG. 4, the segment voltages applied along segment lines 1, 2 and 3 will have no effect on the state of the IMODs, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3, 1), (3, 2) and (3, 3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1, 1) and (1, 2) is greater than the high end of the positive stability window (i.e., the voltage differential exceeded a predefined threshold) of the modulators, and the modulators (1, 1) and (1, 2) are actuated. Conversely, because a high segment voltage 62 is applied along segment line 3, the pixel voltage across modulator (1, 3) is less than that of modulators (1, 1) and (1, 2), and remains within the positive stability window of the modulator; modulator (1, 3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2, 2) is below the lower end of the negative stability window of the modulator, causing the modulator (2, 2) to actuate. Conversely, because a low segment voltage 64 is applied along segment lines 1 and 3, the modulators (2, 1) and (2, 3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3, 2) and (3, 3) actuate, while the high segment voltage 62 applied along segment line 1 causes modulator (3, 1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
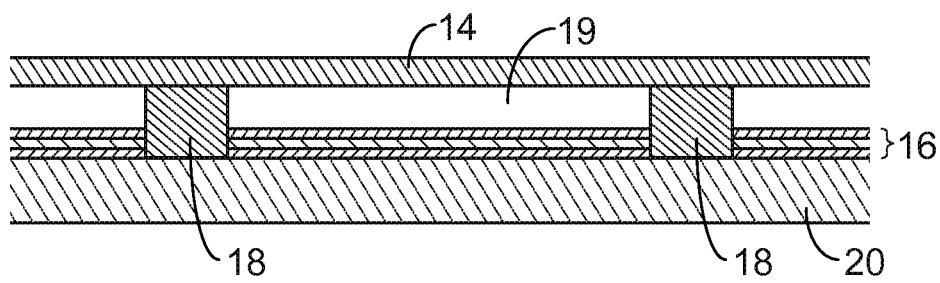
FIG. 6A shows an example of a partial cross-section of the IMOD display of FIG. 1.
Figure 6B:
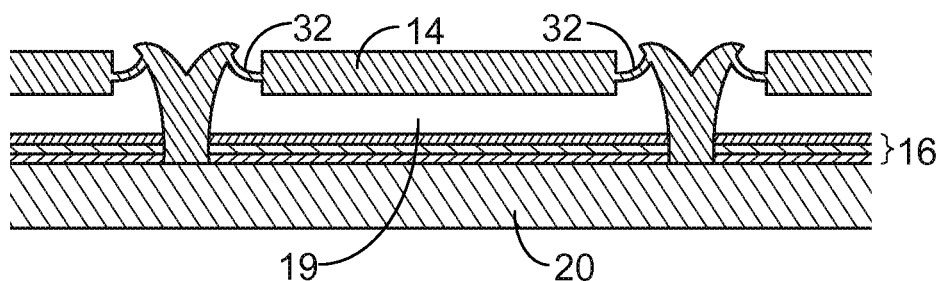
FIGS. 6B-6E show examples of cross-sections of varying implementations of IMODs.
Figure 6C:
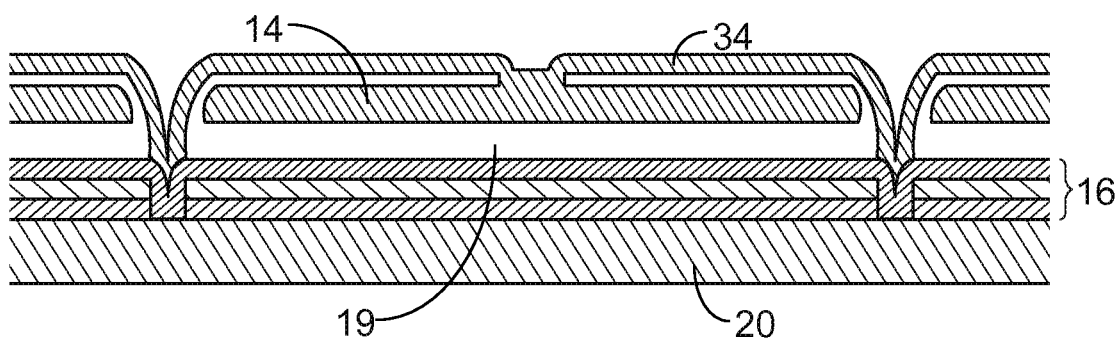

The details of the structure of IMODs that operate in accordance with the principles set forth above may vary widely. For example, FIGS. 6A-6E show examples of cross-sections of varying implementations of IMODs, including the movable reflective layer 14 and its supporting structures. FIG. 6A shows an example of a partial cross-section of the IMOD display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
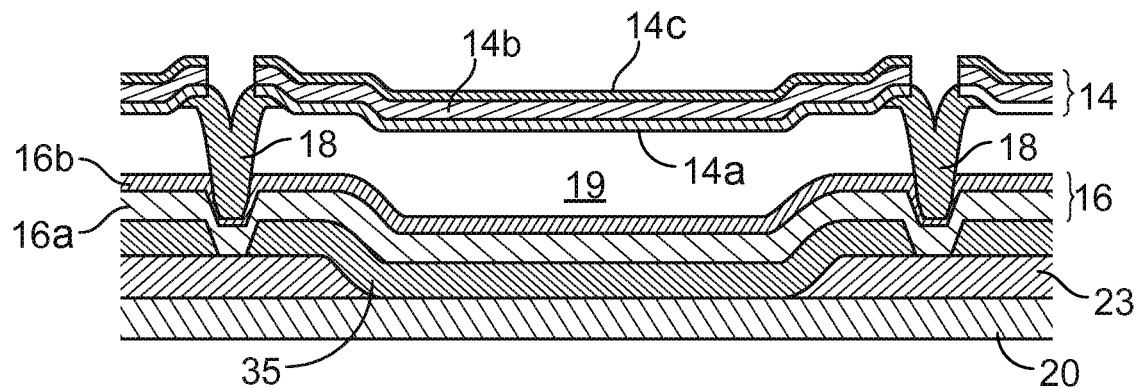

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
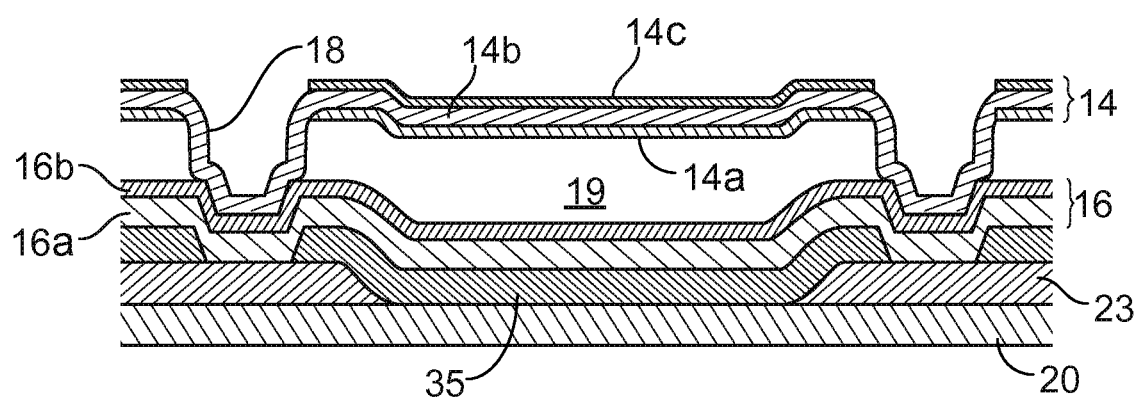

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the IMOD is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
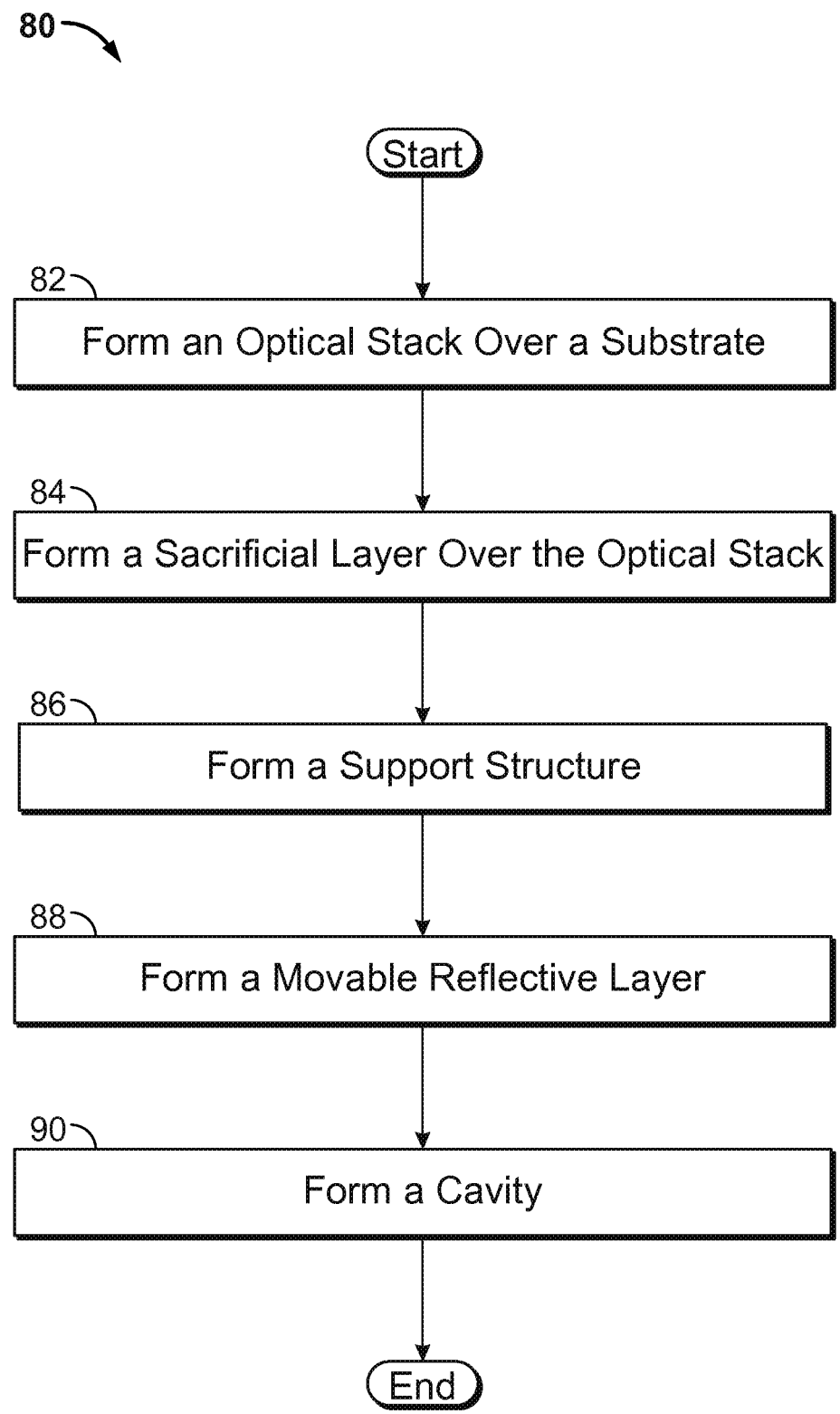
FIG. 7 shows an example of a flow diagram illustrating a manufacturing process for an IMOD.
Figure 8A:
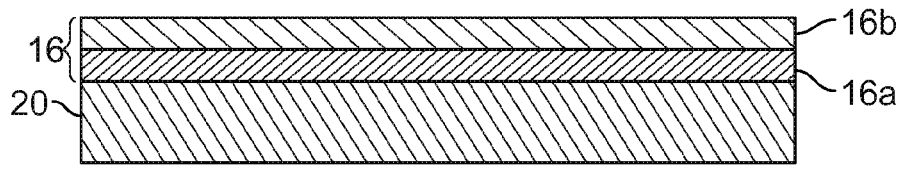
FIGS. 8A-8E show examples of cross-sectional schematic illustrations of various stages in a method of making an IMOD.

FIG. 7 shows an example of a flow diagram illustrating a manufacturing process 80 for an IMOD, and FIGS. 8A-8E show examples of cross-sectional schematic illustrations of corresponding stages of such a manufacturing process 80. In some implementations, the manufacturing process 80 can be implemented to manufacture, e.g., IMODs of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
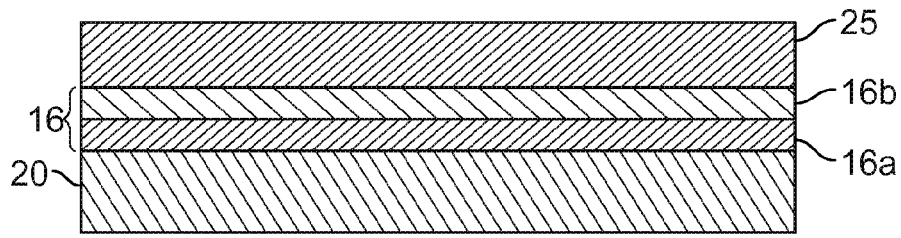

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting IMODs 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
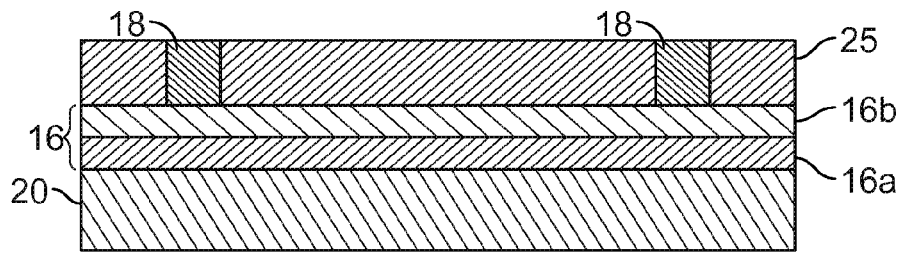

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
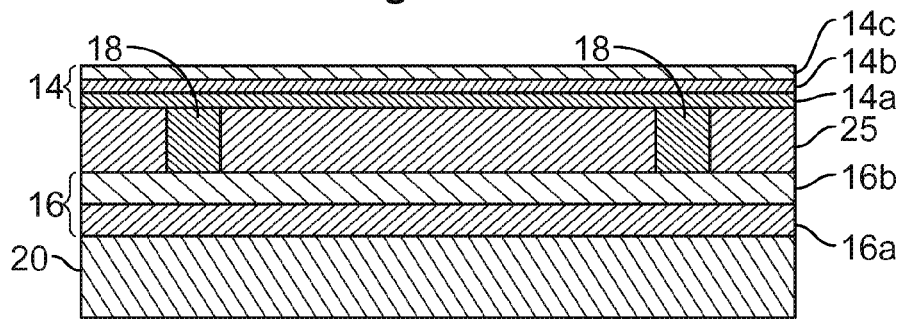
Figure 8E:
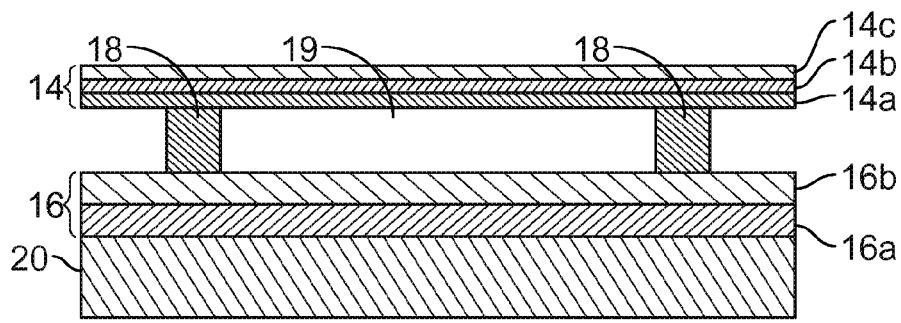

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (such as aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated IMOD formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as molybdenum (Mo) or amorphous silicon (Si) may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

FIGS. 9A-9E show examples of how a multi-state IMOD may be configured to produce different colors. In a multi-state IMOD, such as an analog IMOD (AIMOD), a pixel's reflective color is determined by the gap spacing between an absorber stack and a mirror stack. In FIGS. 9A-9E, the multi-state IMOD 900 includes the mirror stack 905 and the absorber stack 910. In this implementation, the mirror stack 905 includes at least one reflective layer and is movable between at least five positions relative to the absorber stack 910. Accordingly, this implementation of the multi-state IMOD 900 may be an AIMOD or a 5-state IMOD (having a white state, a black state and three colored states). In alternative implementations, the absorber stack 910 may be movable between a plurality of positions relative to the mirror stack 905. In either case, the size of the gap 930 between the mirror stack 905 and the absorber stack 910 may be varied. Although the absorber stack 910 includes a single absorber layer in this example, various implementations described elsewhere herein include absorber stacks 910 that includes multiple absorber layers.

An incident wave having a wavelength λ will interfere with its own reflection from the mirror stack 905 to create a standing wave with local peaks and nulls. The first null is λ/2 from the mirror and subsequent nulls are located at λ/2 intervals. For that wavelength, a thin absorber layer placed at one of the null positions will absorb very little energy.

Figure 9A:
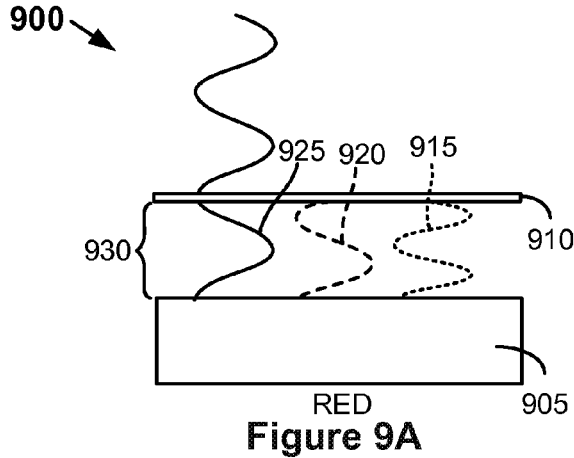
FIGS. 9A-9E show examples of how a multi-state IMOD may be configured to produce different colors.

Referring first to FIG. 9A, when the gap 930 is substantially equal to the wavelength of a red color 925, the absorber stack 910 is positioned at the null of the red interference pattern. Light is partially reflected and partially transmitted by the absorber stack 910. An optical cavity having a depth equal to the size of the gap 930 is formed between the absorber stack 910 and the mirror stack 905. Therefore, light having a wavelength substantially corresponding to the red color 925 is reflected efficiently due to constructive interference between red light reflected from the absorber stack 910 and red light reflected from the mirror stack 905. Light of other colors, including the blue color 915 and the green color 920, is not reinforced by constructive interference. Instead, such light is substantially absorbed by the absorber stack 910.

Figure 9B:
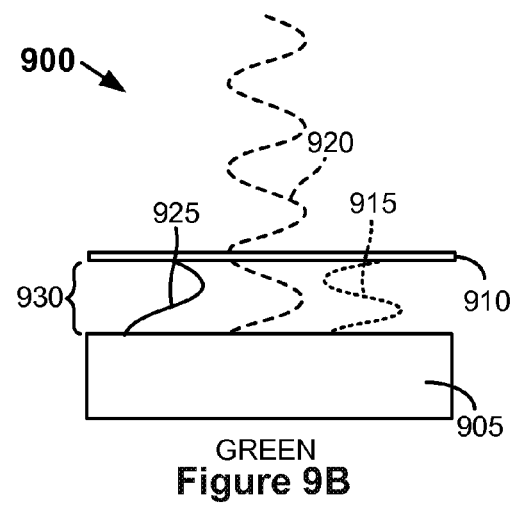

FIG. 9B depicts the multi-state IMOD 900 in a configuration wherein the mirror stack 905 is moved closer to the absorber stack 910 (or vice versa). In this example, the gap 930 is substantially equal to the wavelength of the green color 920. Light having a wavelength substantially corresponding to the green color 920 is reflected efficiently due to constructive interference between green light reflected from the absorber stack 910 and green light reflected from the mirror stack 905. Light of other colors, including the red color 925 and the blue color 915, is substantially absorbed by the absorber stack 910.

Figure 9C:
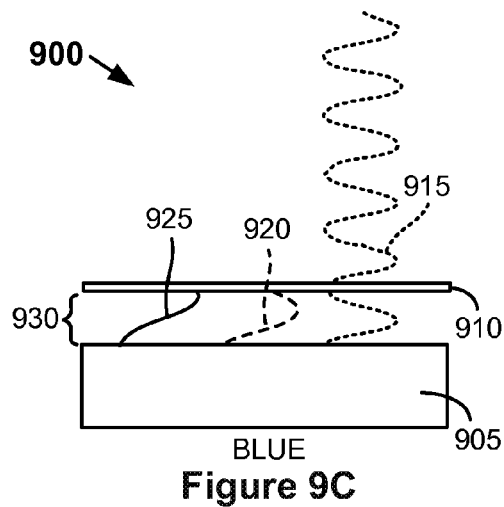

In FIG. 9C, the mirror stack 905 is moved closer to the absorber stack 910 (or vice versa), so that the gap 930 is substantially equal to the wavelength of the blue color 915. Light having a wavelength substantially corresponding to the blue color 915 is reflected efficiently due to constructive interference. Light of other colors, including the red color 925 and the green color 920, is substantially absorbed by the absorber stack 910.

Figure 9D:
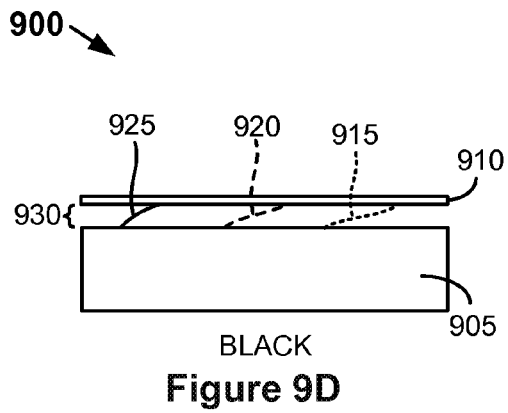

In FIG. 9D, however, the multi-state IMOD 900 is in a configuration wherein the gap 930 is substantially equal to ¼ of the wavelength of the average color in the visible range. In such arrangement, the absorber is located near the intensity peak of the interference standing wave; the strong absorption due to high field intensity together with destructive interference between the absorber stack 910 and the mirror stack 905 causes relatively little visible light to be reflected from the multi-state IMOD 900. This configuration may be referred to herein as a "black state." In some such implementations, the gap 930 may be made larger or smaller than shown in FIG. 9D, in order to reinforce other wavelengths that are outside the visible range. Accordingly, the configuration of the multi-state IMOD 900 shown in FIG. 9D provides merely one example of a black state configuration of the multi-state IMOD 900.

Figure 9E:
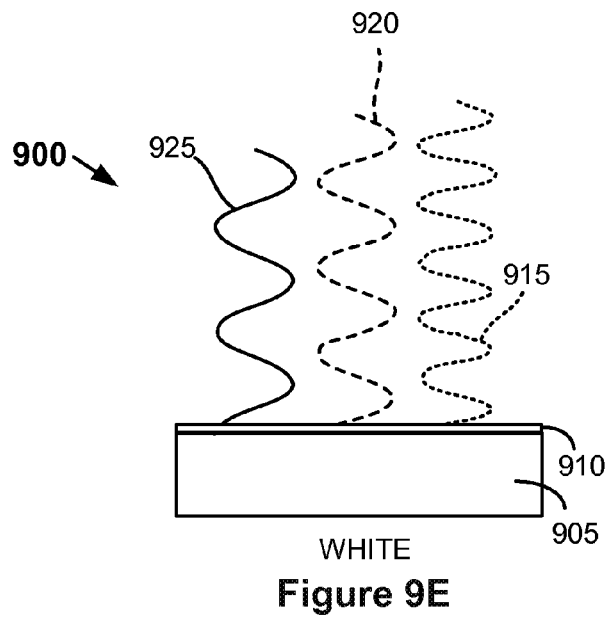

FIG. 9E depicts the multi-state IMOD 900 in a configuration wherein the absorber stack 910 is substantially adjacent to the mirror stack 905. In this example, the gap 930 is negligible. Light having a broad range of wavelengths is reflected efficiently from the mirror stack 905 without being absorbed to a significant degree by the absorber stack 910. This configuration may be referred to herein as a "white state."

Figure 10:
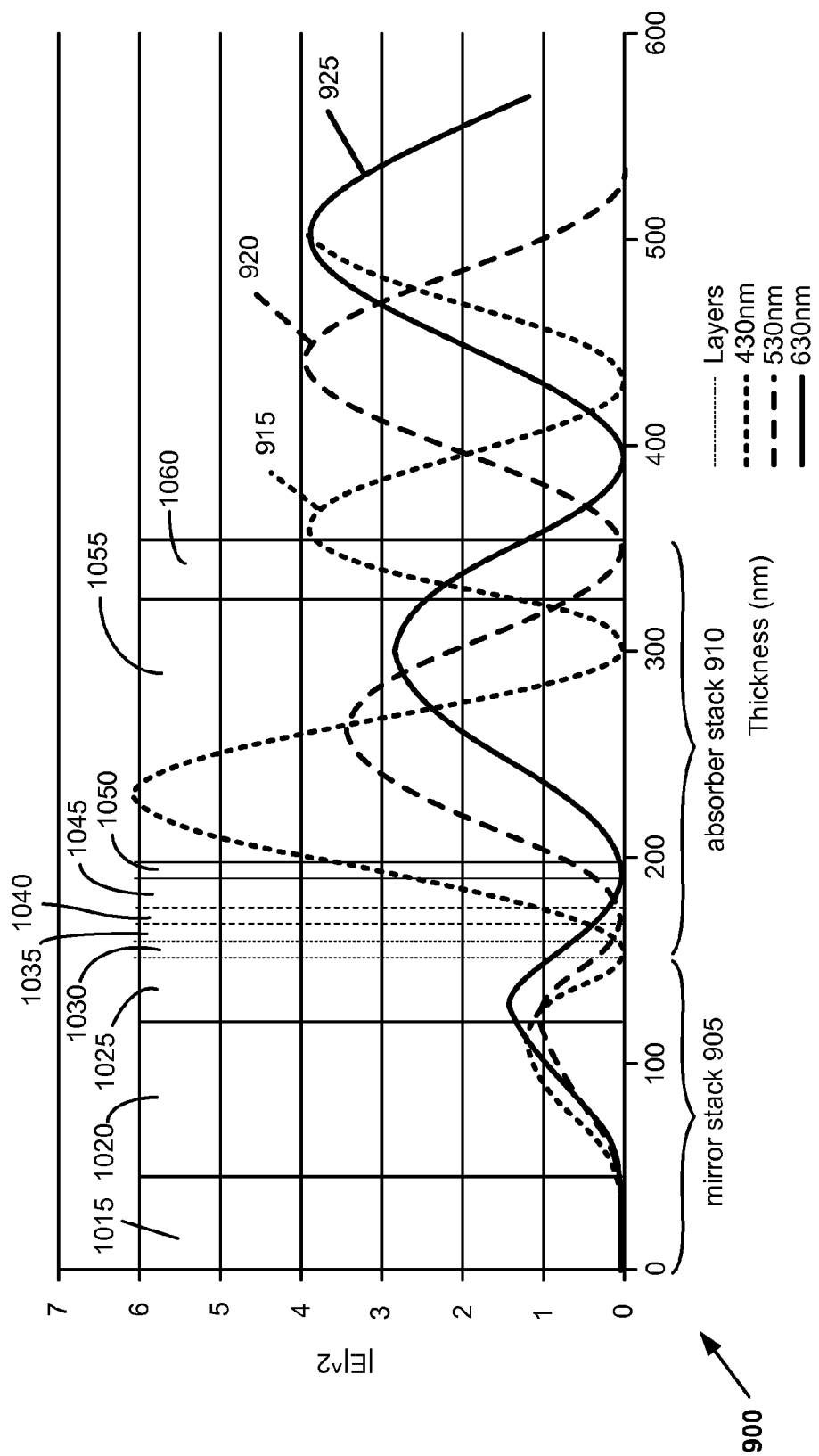
FIG. 10 shows an example of a multi-state IMOD having an optical stack for providing an improved white-state color.

FIG. 10 shows an example of a multi-state IMOD having an optical stack for providing an improved white-state color. The multi-state IMOD 900 may, for example, be a 3-state IMOD (having a white state, a black state and one colored state), a 5-state IMOD or an AIMOD. In this implementation, as in FIG. 9E, there is substantially no gap between the mirror stack 905 and the absorber stack 910 when the multi-state IMOD 900 is in the white state. Here, the mirror stack 905 includes layers 1015, 1020 and 1025. The layer thicknesses are indicated by the horizontal axis of FIG. 10. In this example, the layer 1015 is formed of aluminum (Al), the layer 1020 is formed of silicon oxynitride ($SiO_xN_y$) and the layer 1025 is formed of titanium oxide ($TiO_2$). However, in alternative implementations the mirror stack 905 may include layers formed of different materials and/or having different thicknesses. Other possible materials for 1020 include silicon dioxide ($SiO_2$), magnesium fluoride ($MgF_2$), aluminum oxide ($Al_2O_3$), Hafnium Fluoride ($HfF_4$), Ytterbium Fluoride ($YbF_3$), Cryolite ($Na_3AlF_6$), and other dielectric materials. Other possible materials for 1025 include titanium oxide ($Ta_2O_5$), antimony oxide ($Sb_2O_3$), Hafnium Oxide ($HfO_2$), Scandium Oxide ($Sc_2O_3$), Indium Oxide ($In_2O_3$), Indium-tin Oxide ($Sn:In_2O_3$), and other such dielectric materials.

In this example, the absorber stack 910 includes three separate absorber layers corresponding to nulls for the blue color 915, the green color 920 and the red color 925: the absorber layer 1030 is positioned at the first null for a wavelength of about 430 nm, the absorber layer 1040 is positioned at the first null for a wavelength of about 530 nm and the absorber layer 1050 is positioned at the first null for a wavelength of about 630 nm. In this design simulation, the absorption spectrum of the blue, green and red absorbers were based on a mathematical model that peak at the center of their corresponding absorption wavelength bands (e.g., approximately 430 nm, 530 nm, and 630 nm respectively) and drop to near zero at the center of wavelength band of the other absorbers.

In some implementations, the absorber layers may be fabricated via thin film deposition and doping with one or more dyes having a suitable red, green and blue absorption coefficient profile. The absorber layers 1030, 1040 and 1050 may have absorption levels that drop to nearly zero at the center of each neighboring absorber layer's absorption peak. For example, the absorber layer 1030 may have an absorption level that drops to nearly zero at the center of the absorption peak of the absorber layer 1040 or 1050. The absorber layer 1040 may have an absorption level that drops to nearly zero at the centers of the absorption peaks of the absorber layers 1030 and/or 1050.

This example includes substantially transparent dielectric layers between the absorber layers. Here, the layers 1035, 1045 and 1055 are formed of $SiO_2$, whereas the layer 1060 is formed of silicon nitride ($Si_3N_4$). In this example, the layers 1035 and 1045 are 8 nm thick, whereas the layer 1045 is 15 nm thick. The thickness of the layers of 1035 and 1045 are optimized to have the nulls of 530 nm wavelength light and 630 nm wavelength light coincide with 1040 and 1050 respectively. However, the layers 1035 and 1045 may have other thicknesses in alternative implementations. Moreover, dielectric materials other than $SiO_2$ can be used for the layers 1035 and 1045.

FIG. 10 also indicates the resulting interference standing wave field intensity distribution when the multi-state IMOD 900 in the white state. Outside of the absorber stack 910, the blue color 915, the green color 920 and the red color 925 all have comparable field intensities.

Figure 11A:
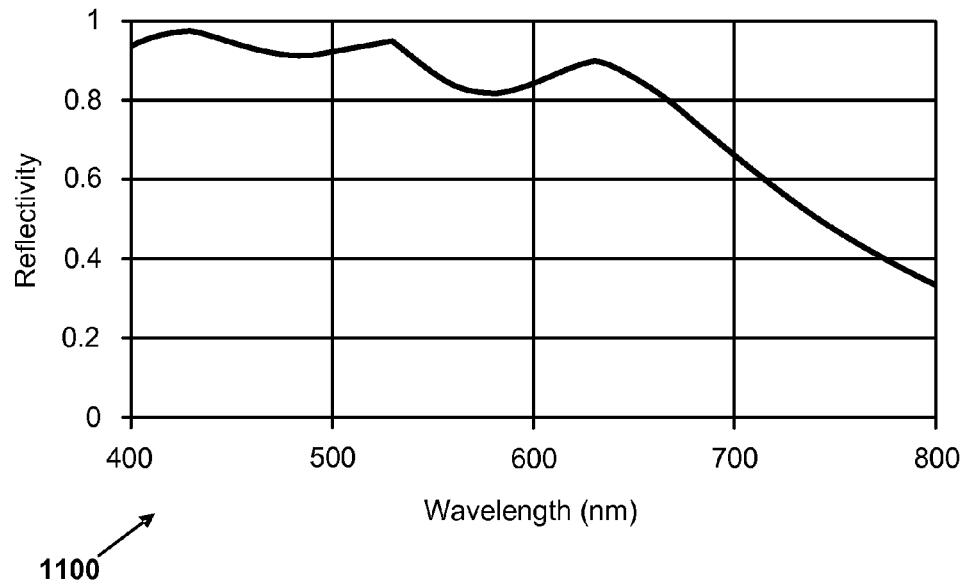
FIG. 11A shows an example of a graph of reflectivity versus wavelength for the multi-state IMOD shown in FIG. 10.

FIG. 11A shows an example of a graph of reflectivity versus wavelength for the multi-state IMOD shown in FIG. 10. FIG. 11A indicates the reflectivity across a wavelength range from 400 nm to 800 nm when the multi-state IMOD 900 is in the white state. In this example, the reflectivity is relatively constant across most wavelengths in the visible range, except in the longest wavelength ranges. Between 400 nm and about 660 nm, the reflectivity ranges between 0.8 and 1. Accordingly, this implementation produces a white-state color that is similar to that of CIE Standard Illuminant D65.

In some implementations, the absorption spectrum properties of the absorber layers may be controlled according to the sizes and/or shapes of nanoparticles in a thin film. In some such implementations, the extinction spectrum of an absorber layer may be controlled according to the ratio of the major axis to the minor axis of nanospheroids in a thin film.

Figure 11B:
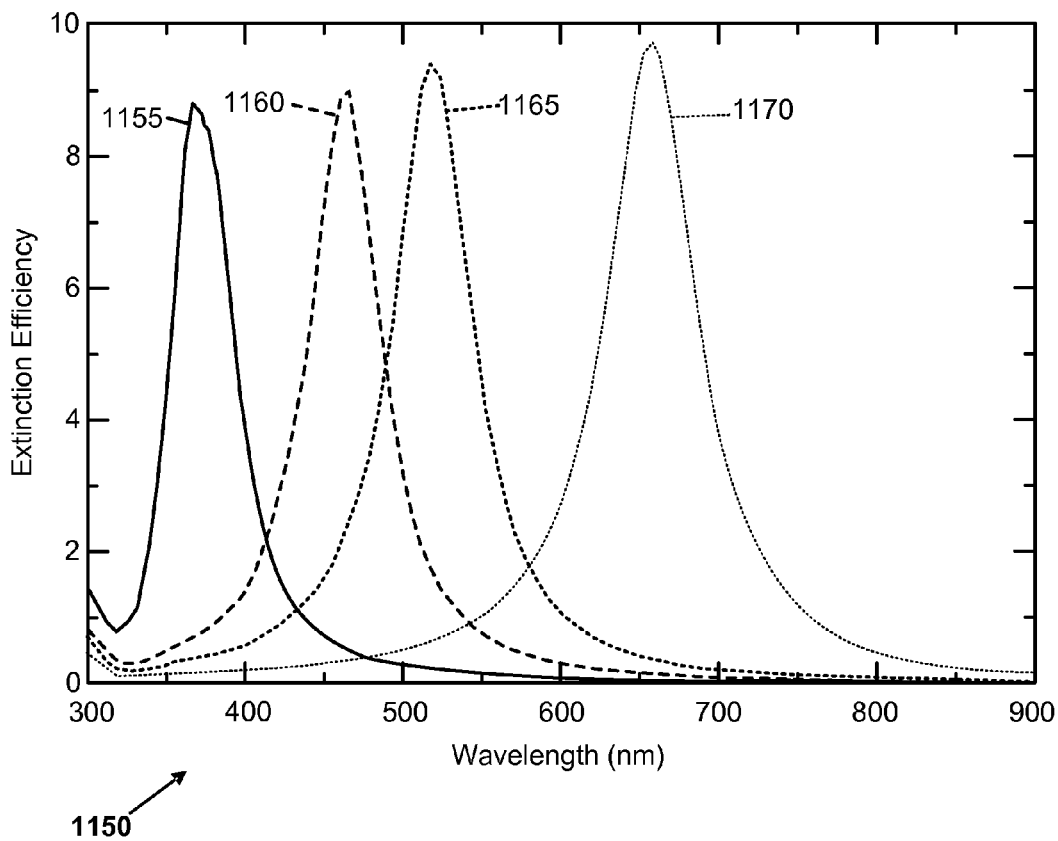
FIG. 11B shows an example of a graph of extinction efficiency versus wavelength for nanospheroids having different ratios of major axis to minor axis.

FIG. 11B shows an example of a graph of extinction efficiency versus wavelength for nanospheroids having different ratios of major axis to minor axis. In graph 1150, the extinction spectra of material doped with four shapes of silver nanospheroids are shown. All of the nanospheroids have the same volume, which corresponds to that of a sphere having a radius of 30 nm. However, other implementations may include nanospheroids formed of other material, having other shapes and/or sizes. In this example, the curve 1155, having a peak at approximately 365 nm, represents the extinction spectrum of a material doped with silver nanospheroids having a minor axis to major axis ratio (R) of 1:1. The curve 1160, having a peak at approximately 460 nm (in the blue range), represents the extinction spectrum of a material doped with silver nanospheroids wherein R is 3:10. The curve 1165 has a peak at approximately 520 nm (in the green range) and represents the extinction spectrum of a material doped with silver nanospheroids wherein R is 1:5. The curve 1170 has a peak at approximately 660 nm (in the red range) and represents the extinction spectrum of a material doped with silver nanospheroids wherein R is 1:10.

In this implementation, the extinction efficiency levels represented by the curves 1155, 1160, 1165 and 1170 drop off steeply on either side of the peak wavelength. For example, the extinction efficiency of the material doped with silver nanospheroids wherein R is 1:5, represented by the curve 1160, is almost 9 at the peak level. The extinction efficiency of this material drops to less than 1 at the wavelength corresponding to the peak of the curve 1165, and drops to nearly zero at the wavelength corresponding to the peak of the curve 1170. Similarly, the extinction efficiency of the material doped with silver nanospheroids wherein R is 1:10, represented by the curve 1170, is close to 10 at the peak level. The extinction efficiency of this material drops to less than 1 at the wavelength corresponding to the peak of the curve 1165, and is approaching zero at the wavelength corresponding to the peak of the curve 1160. Therefore, if the absorber layers of the multi-state IMOD 900 were formed of thin films doped with such silver nanospheroids, the absorber layers would have absorption levels (extinction efficiency levels) that drop to nearly zero at the centers of neighboring absorber layers' absorption peaks.

Figure 12:
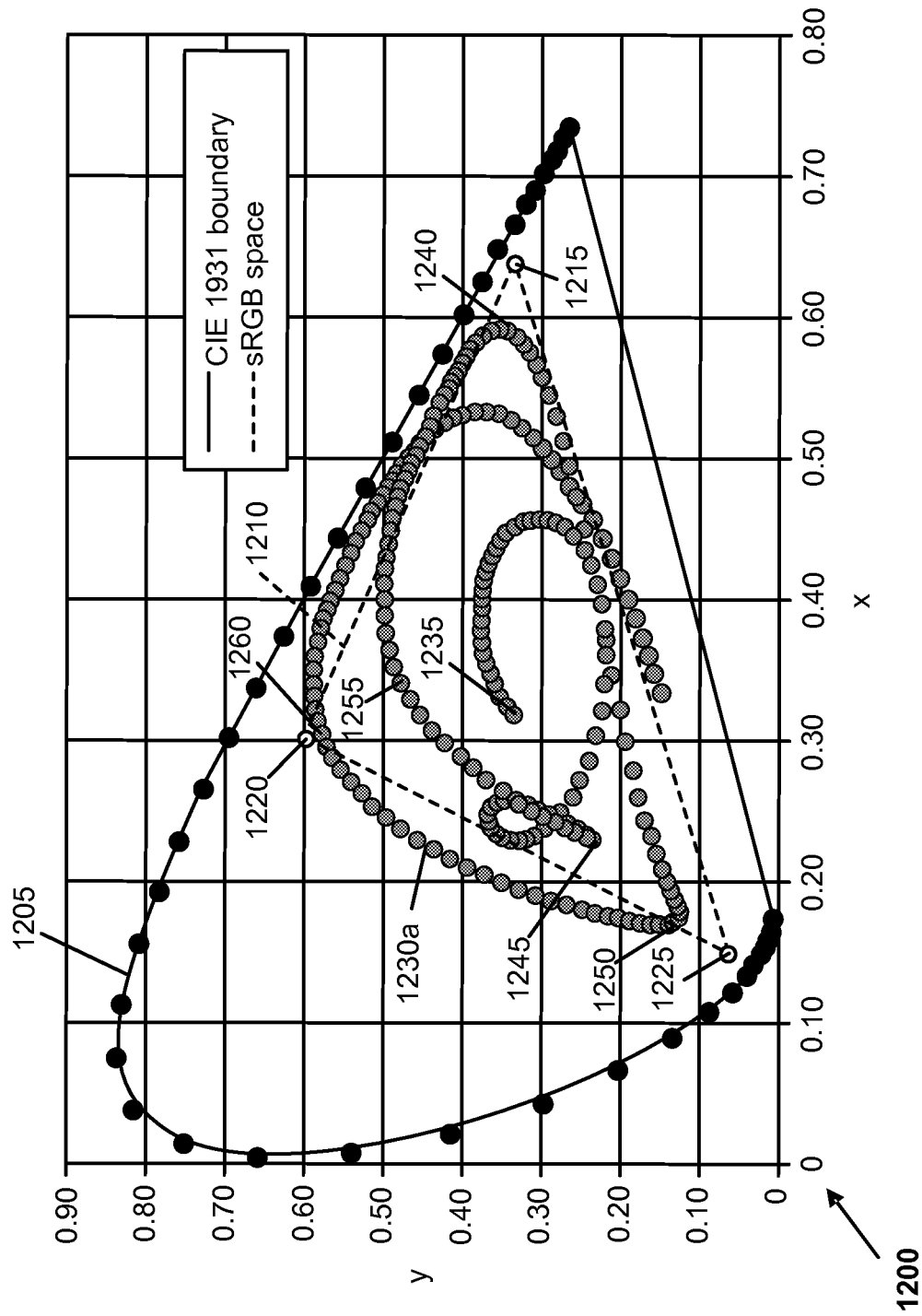
FIG. 12 shows an example of an analog IMOD (AIMOD) color spiral (in x-y chromaticity color space) generated by varying the gap between the mirror stack and the absorber stack of the multi-state IMOD shown in FIG. 10.

FIG. 12 shows an example of the analog IMOD (AIMOD) color spiral (in x-y chromaticity color space) generated by varying the gap between the mirror stack and the absorber stack of the multi-state IMOD shown in FIG. 10. The curve 1205 indicates the boundary of the CIE (International Commission on Illumination) 1931 color space. The triangle 1210 depicts the sRGB space, which has a red vertex 1215, a green vertex 1220 and a blue vertex 1225. The color spiral 1230*a* indicates the colors reflected from the multi-state IMOD 900 shown in FIG. 10 when the gap 930 between the mirror stack 905 and the absorber stack 910 is varied from zero to 640 nm.

At the position 1235, which corresponds to a white state of the multi-state IMOD 900, the gap 930 is substantially zero. The position 1235 substantially corresponds to that of CIE Standard Illuminant D65, which corresponds roughly to the mid-day sun in western or northern Europe. Therefore, the white state of this implementation of the multi-state IMOD 900 is a nearly ideal white state.

The position 1240 corresponds to a first-order red state of the multi-state IMOD 900. In the position 1240 the gap 930 is approximately 345 nm. The first-order red state achieves good color saturation, being relatively close to the red vertex 1215 of the sRGB space.

For some implementations of multi-state IMOD 900, second-order colors are more saturated than first-order colors. For example, the position 1245 corresponds to a first-order blue color and the position 1250 corresponds to a second-order blue color and a gap 930 of approximately 430 nm. In this example, the second-order blue color is much closer to the blue vertex 1225 of the sRGB space than the first-order blue color and is therefore more saturated. Similarly, the position 1255 corresponds to a first-order green color and the position 1260 corresponds to a second-order green color (and a gap 930 of approximately 530 nm). In this example, the second-order green color is adjacent to the green vertex 1220 of the sRGB space and is therefore more saturated than the first-order green color.

It can be desirable for a multi-state IMOD 900 to achieve a white state without having the absorber stack 910 come in contact with the mirror stack 905. In such implementations, the movable portion (e.g., the mirror stack 905) may be relatively more mechanically stable. Problems such as stiction and charging induced by mirror pull-in may be reduced or prevented. Therefore, some alternative implementations described herein can achieve a white state with a larger gap 930 (such as a gap 930 of approximately 10 nm to 100 nm or more).

Figure 13:
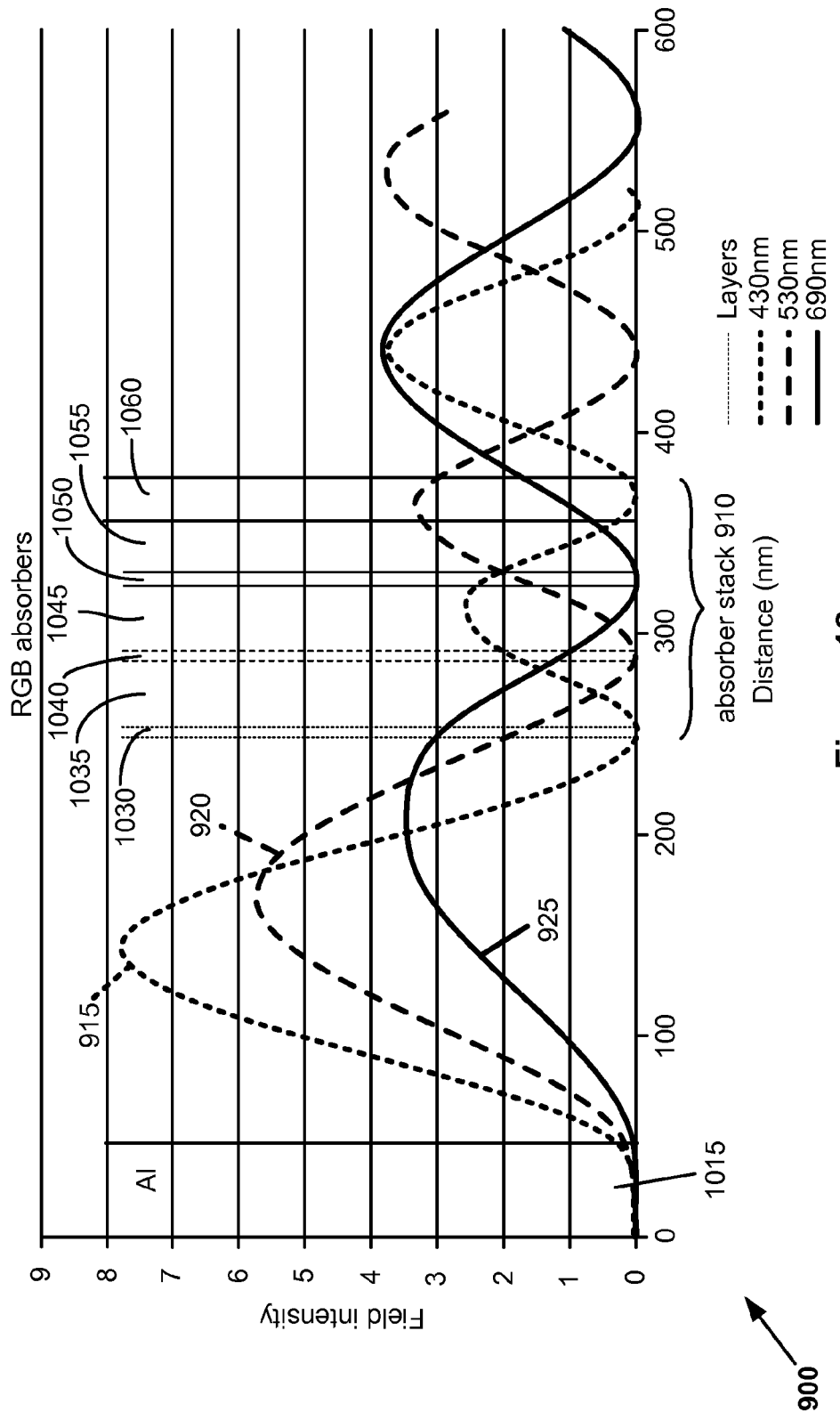
FIG. 13 shows an example of an alternative multi-state IMOD.

FIG. 13 shows an example of an alternative multi-state IMOD. In this example, the white state of the multi-state IMOD 900 occurs when the absorber stack 910 is approximately 200 nm from the layer 1015, which is a reflective Al layer. This implementation does not include the layers 1020 or 1025 of the mirror stack 905 shown in FIG. 10. In this example, the absorber layer 1030 is 5 nm thick and is positioned at the first null for a wavelength of 430 nm. The absorber layer 1040 is 6 nm thick and is positioned at the first null for a wavelength of 530 nm. The absorber layer 1050 is 7 nm thick and is positioned at the first null for a wavelength of 630 nm. However, other thicknesses and configurations are possible.

FIG. 13 also indicates the resulting interference standing wave field intensity distribution when this implementation of the multi-state IMOD 900 in a white state. Outside of the absorber stack 910, the blue color 915, the green color 920 and the red color 925 all have comparable field intensities.

Figure 14:
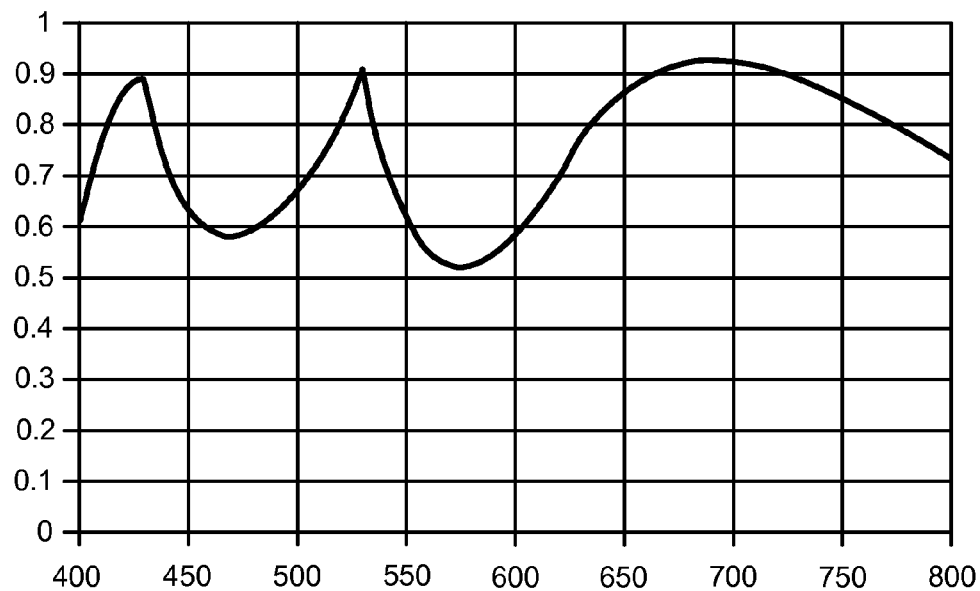
FIG. 14 shows an example of a graph of reflectivity versus wavelength for the multi-state IMOD shown in FIG. 13.

However, the reflectivity of this implementation is not as consistent across the visible spectrum as that of the previously-described implementation. FIG. 14 shows an example of a graph of reflectivity versus wavelength for the multi-state IMOD shown in FIG. 13. The reflectivity varies substantially over the visible range, with three peaks of 0.9 or more and two troughs below 0.6. By comparing FIG. 14 to FIG. 11A, it may be seen that the multi-state IMOD 900 shown in FIG. 10 has a more consistent reflectivity across the visible spectrum. However, the multi-state IMOD 900 shown in FIG. 13 has relatively greater reflectivity for longer wavelengths.

Figure 15:
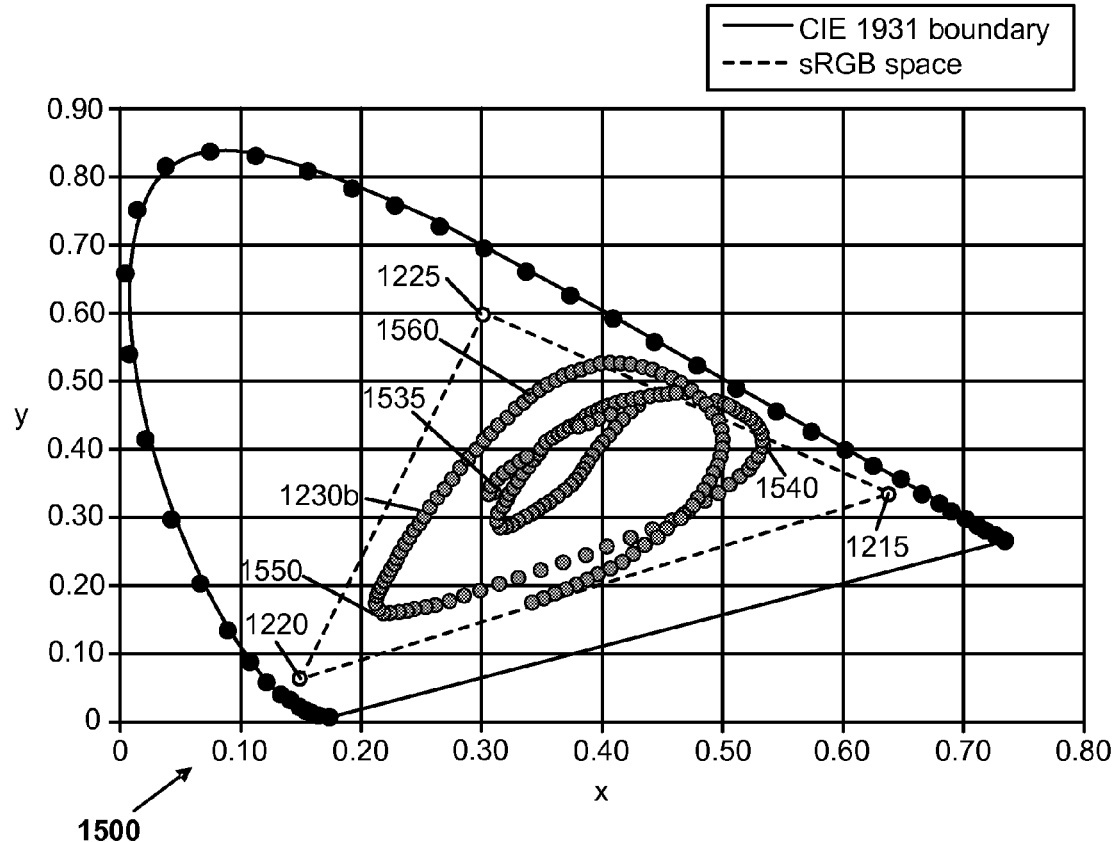
FIG. 15 shows an example of the AIMOD color spiral generated by varying the gap between the mirror stack and the absorber stack of the multi-state IMOD shown in FIG. 13.

FIG. 15 shows an example of the AIMOD color spiral generated by varying the gap between the mirror stack and the absorber stack of the multi-state IMOD shown in FIG. 13. The color spiral 1230*b* indicates the colors reflected from the multi-state IMOD 900 shown in FIG. 13 when the gap 930 between the mirror stack 905 and the absorber stack 910 is increased from the white-state configuration at 200 nm and varied through a range of cavity sizes. The position 1535, which corresponds to the white-state configuration wherein the gap 930 is 200 nm, is reasonably close to the position of CIE Standard Illuminant D65. Therefore, this implementation produces an acceptable white state.

However, by comparing FIGS. 12 and 15, it may be observed that the implementation of the multi-state IMOD 900 shown in FIG. 13 has poorer color saturation than that of the multi-state IMOD 900 shown in FIG. 10. The position 1540, which corresponds to a first-order red color, is not nearly as close to the red vertex 1215 as the position 1240 (see FIG. 12). The position 1550, which corresponds to a second-order blue color, is not nearly as close to the blue vertex 1225 as the position 1250 in FIG. 12. The position 1560, which corresponds to a second-order green color, is not nearly as close to the green vertex 1220 as the position 1260 in FIG. 12.

A third implementation of the multi-state IMOD 900 may be configured to provide improved color saturation as compared to the multi-state IMOD 900 of FIG. 13, while still providing an acceptable white state with a gap 930 between the mirror stack 905 and the absorber stack 910. In this implementation, the mirror stack 905 includes the layers 1015, 1020 and 1025, substantially as shown in FIG. 10. In this example, the layer 1015 is formed of 40 nm of Al, the layer 1020 is formed of 72 nm of silicon oxynitride and the layer 1025 is formed of 24 nm of $TiO_2$. However, the layers 1015, 1020 and 1025 may have other thicknesses and configurations in alternative implementations.

In this example, however, the absorber stack 910 is configured differently. The absorber layer 1030 of the absorber stack 1010 is 5 nm thick, whereas the absorber layer 1040 is 6 nm and the absorber layer 1050 is 7 nm thick. The layers 1035, 1045 and 1055 all formed of $SiO_2$. However, the layer 1035 is 7 nm thick, the layer 1045 is 12 nm thick and the layer 1055 is 41 nm thick. In this example, the layer 1060 is formed of $Si_3N_4$ and is 31 nm thick. Alternative implementations may have different layer thicknesses and/or configurations.

Figure 16:
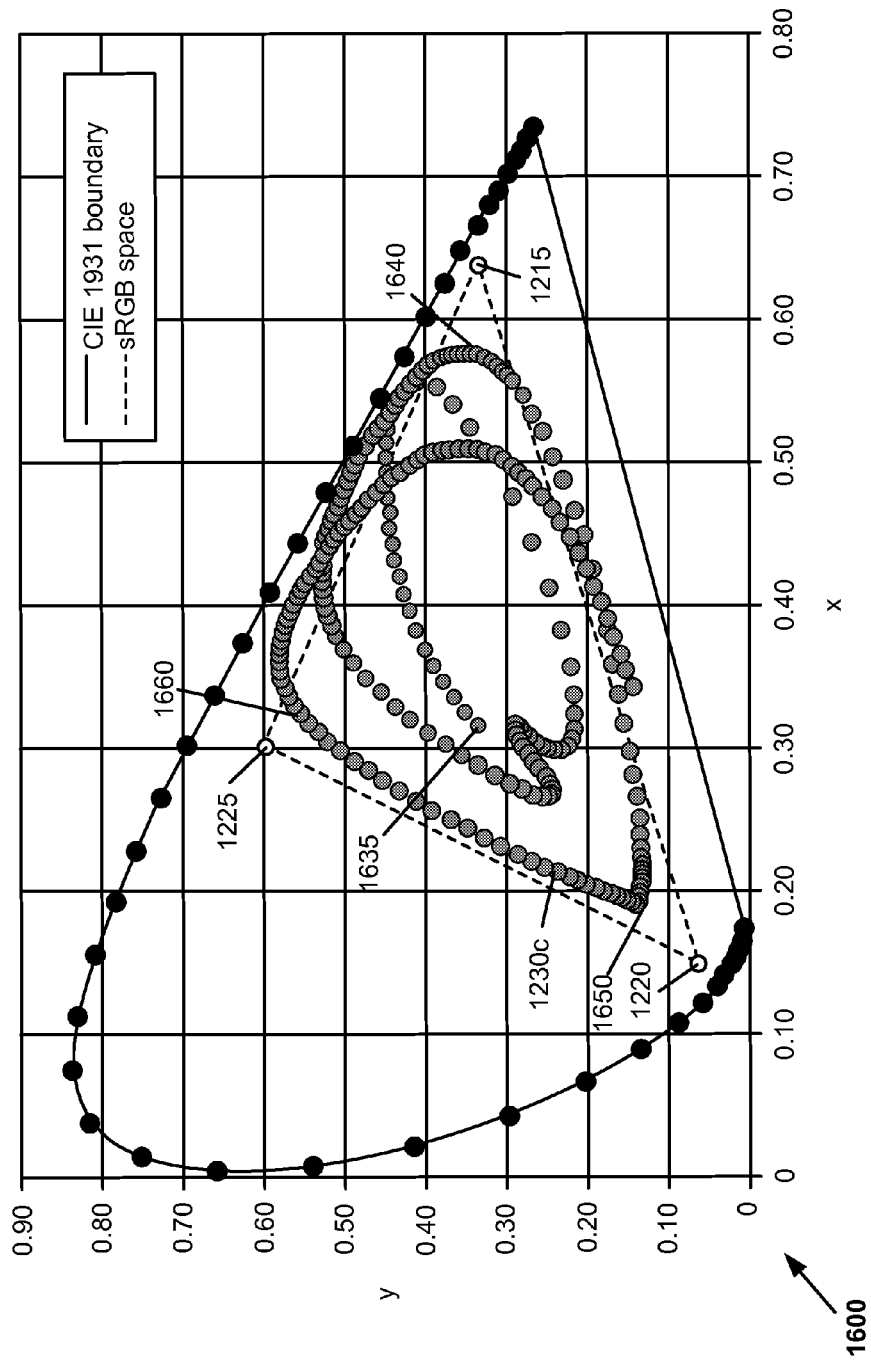
FIG. 16 shows an example of the AIMOD color spiral generated by varying the gap between the mirror stack and the absorber stack of the third multi-state IMOD implementation.

FIG. 16 shows an example of the AIMOD color spiral generated by varying the gap between the mirror stack and the absorber stack of the third multi-state IMOD implementation. The white state is when the air gap is approximately 10 nm thick. The white-space color of this implementation, corresponding to the position 1635 of the color spiral 1230c, closely approximates that of CIE Standard Illuminant D65.

By comparing the color spiral of FIG. 16 with that of FIG. 15, it may be observed that the color saturation provided by this implementation is superior to that provided by the multi-state IMOD 900 of FIG. 13. The position 1640, which corresponds to a first-order red color, is substantially closer to the red vertex 1215 of the sRGB space than the position 1540 of FIG. 15. The position 1650 shown in FIG. 16, which corresponds to a second-order blue color, is substantially closer to the blue vertex 1225 than the position 1550 of FIG. 15. The position 1660 of FIG. 16, which corresponds to a second-order green color, is substantially closer to the green vertex 1220 than the position 1520 of FIG. 15.

Figure 17:
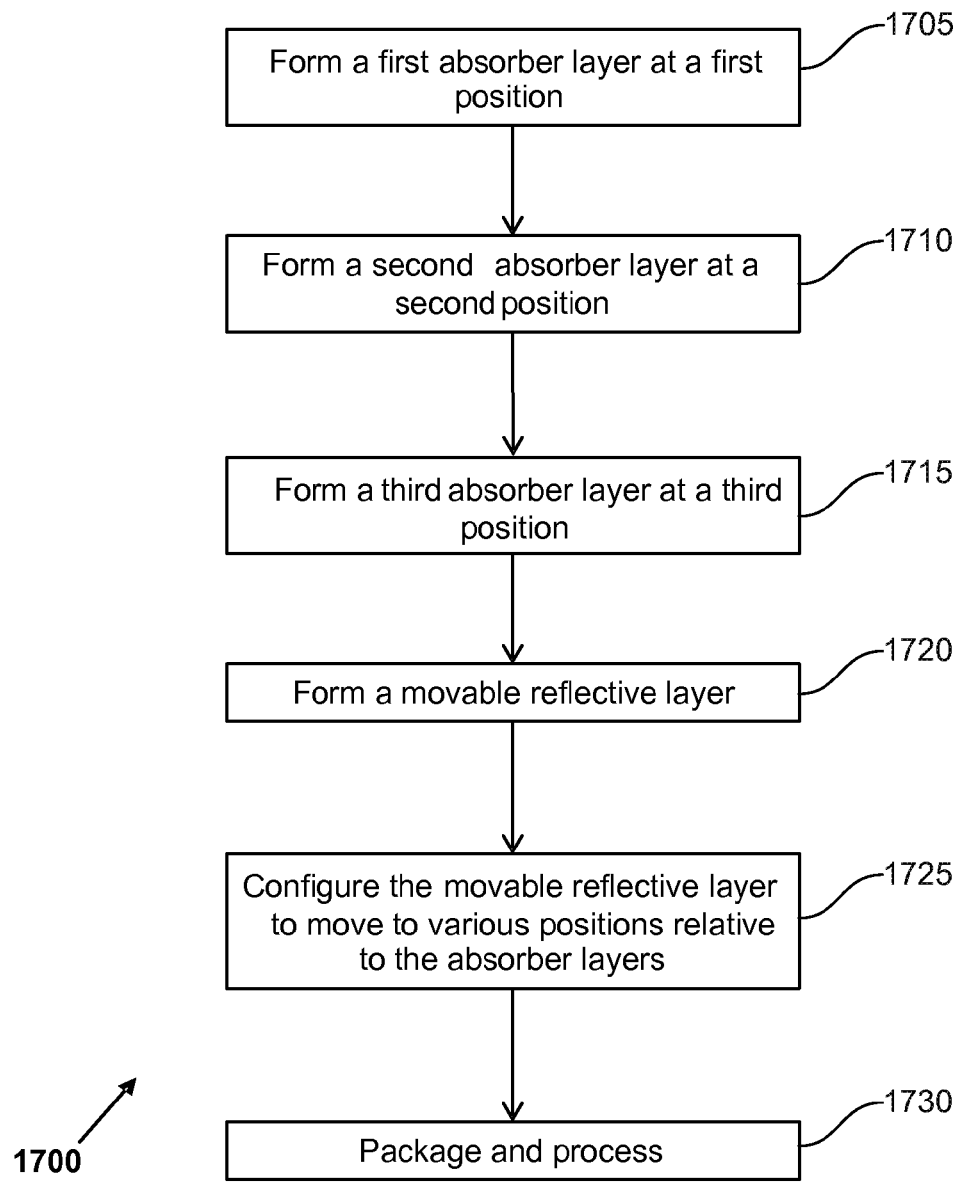
FIG. 17 shows an example of a flow diagram for a process of fabricating some multi-state IMODs described herein.

FIG. 17 shows an example of a flow diagram for a process of fabricating some multi-state IMODs described herein. As with other processes shown and described herein, the blocks of process 1700 are not necessarily performed in the order indicated. The process 1700 may, in some implementations, be similar to the manufacturing process 80 that is described above with reference to FIG. 7. For example, blocks 1705 through 1715 of process 1700 may be similar to block 82 of the manufacturing process 80: both processes involve the formation of an optical stack that includes a multilayer structure. In some implementations, at least one of the sub-layers can be configured with both optically absorptive and conductive properties. Additionally, one or more of the sub-layers may be patterned into substantially parallel strips, and may form row or column electrodes in a display device. Such patterning can be performed by a masking and etching process or other suitable processes.

Block 1705 involves forming a first absorber layer at a first position. The first absorber layer may be positioned at the first null for a first wavelength. For example, referring to FIG. 10, block 1705 may involve forming the absorber layer 1050 at the first null for a wavelength in the red range, e.g. for a wavelength of 630 nm, when the mirror stack is actuated to white state. The absorber layer may be formed on a substantially transparent substrate having one or more layers. In this example, block 1705 involves forming the absorber layer 1050 on the layer 1055, which may be formed of $SiO_2$ or of another suitable material.

Block 1710 involves forming a second absorber layer at a second position. The second absorber layer may be positioned at the first null for a second wavelength. For example, referring to FIG. 10, block 1710 may involve forming the absorber layer 1040 at the first null for a wavelength in the green range, such as a wavelength of 530 nm, when the mirror stack is actuated to white state. In this implementation, the second absorber layer is formed on a substantially transparent layer, such as the layer 1045 shown in FIG. 10. The layer 1045 may be formed as part of block 1705 or of block 1710.

Block 1715 involves forming a third absorber layer at a third position. The third absorber layer may be positioned at the first null for a third wavelength. For example, referring to FIG. 10, block 1715 may involve forming the absorber layer 1030 at the first null for a wavelength in the blue range, such as a wavelength of 430 nm, when the mirror stack is actuated to white state. In this implementation, the third absorber layer is formed on a substantially transparent layer, such as the layer 1035 shown in FIG. 10. The layer 1035 may be formed as part of block 1710 or of block 1715.

In this example, the first, second and third absorber layers are formed of absorbing thin films with their absorption spectrum having a suitable red, green and blue extinction coefficient profile similar to that of 1160, 1165 and 1170 illustrated in FIG. 11B. The thickness of the absorbers can be optimized according to the refractive index and extinction coefficient of the material to achieve maximum absorption of when the absorber is located at the peak of the standing wave of corresponding wavelength band. For example, at least one of the first absorber layer, the second absorber layer or the third absorber layer may be formed of a metal nanoparticle thin film. The absorber layers may have absorption levels that drop to nearly zero at the center of neighboring absorber layers' absorption peaks.

Block 1720 involves forming a movable reflective layer. The movable reflective layer may be formed via one or more deposition steps, e.g., reflective layer (such as aluminum, aluminum alloy) deposition, along with one or more patterning, masking, and/or etching steps. The movable reflective layer may be electrically conductive. In some implementations, the movable reflective layer may include a plurality of sub-layers.

In this implementation, block 1720 involves forming a mirror stack such as the mirror stack 905 shown in FIG. 10. In this example, the layer 1015 is formed of Al, the layer 1020 is formed of silicon oxynitride and the layer 1025 is formed of $TiO_2$. However, in alternative implementations block 1720 may involve forming a mirror stack 905 that includes layers formed of different materials and/or having different thicknesses.

The reflective layer may be made movable by forming a sacrificial layer on the absorber stack, then forming the mirror stack 905 on the sacrificial layer. Forming the sacrificial layer may involve depositing a xenon difluoride-etchable material such as molybdenum (Mo) or amorphous silicon. Deposition of the sacrificial material may be carried out using deposition techniques such as physical vapor deposition (e.g., sputtering), plasma-enhanced chemical vapor deposition, thermal chemical vapor deposition, or spin-coating.

After forming the reflective layer(s), the sacrificial material may be removed. For example, an etchable sacrificial material such as Mo or amorphous silicon may be removed by dry chemical etching, e.g., by exposing the sacrificial layer to a gaseous or vaporous etchant, such as vapors derived from solid $XeF_2$. Other etching methods, e.g. wet etching and/or plasma etching, also may be used to remove the sacrificial layer and release the movable reflective layer.

Block 1725 involves configuring the movable reflective layer to move to various positions relative to the absorber stack. Each position may, for example, correspond with a different applied voltage. In some implementations, block 1725 may involve configuring the movable reflective layer for moving to a least three positions relative to the absorber stack. Such implementations may involve forming a 3-state IMOD having a white state, a black state and one colored state. In some other implementations, block 1725 may involve configuring the movable reflective layer for moving to a least five positions relative to the absorber stack. Such implementations may involve forming a 5-state IMOD having a white state, a black state and three colored states.

In yet other implementations, block 1725 may involve configuring the movable reflective layer for moving to more than five positions relative to the absorber stack. In some such implementations, block 1725 may involve forming an analog IMOD that is configured to move the movable reflective layer between a range of different positions relative to the absorber stack (or vice versa).

Block 1730 may involve packaging and processing. For example, block 1730 may involve the singulation and/or packaging of arrays of IMODs fabricated as described herein. Block 1730 may involve the configuration of one or more processors, driver controllers, etc., for communication with such IMOD arrays. Block 1730 may involve assembling display devices that include the IMOD arrays, or packaging the IMOD arrays for shipment and/or storage.

Figure 18A:
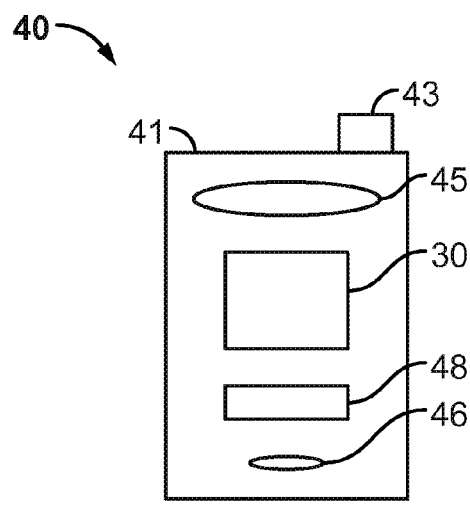
FIGS. 18A and 18B show examples of system block diagrams illustrating a display device that includes a plurality of IMODs.
Figure 18B:
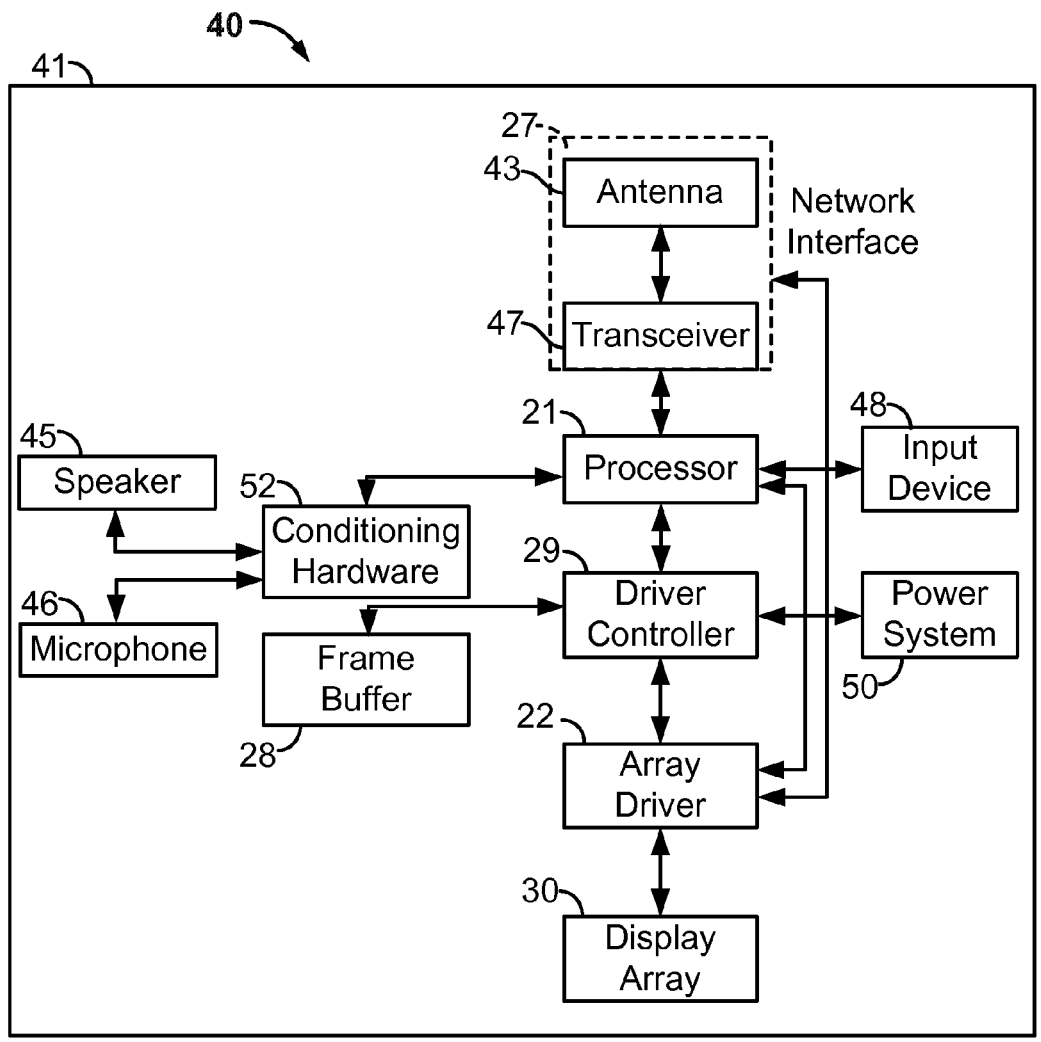

FIGS. 18A and 18B show examples of system block diagrams illustrating a display device 40 that includes a plurality of IMODs. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein.

The components of the display device 40 are schematically illustrated in FIG. 18B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power system 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone integrated circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or other small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power system 50 can include a variety of energy storage devices. For example, the power system 50 may include a rechargeable battery, such as a nickel-cadmium battery or a lithium-ion battery. In implementations using a rechargeable battery, the rechargeable battery may be chargeable using power coming from, for example, a wall socket of a photovoltaic device or array. Alternatively, the rechargeable battery can be wirelessly chargeable. The power system 50 also can include a renewable energy source, a capacitor, or a solar cell, including a plastic solar cell or solar-cell paint. The power system 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations. The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A multi-state interferometric modulator (IMOD), comprising:
   a movable reflective layer; and
   an absorber layer stack including a first absorber layer having a first absorption coefficient and a first absorption peak at a first wavelength of light, a second absorber layer having a second absorption coefficient and a second absorption peak at a second wavelength of light, and a third absorber layer having a third absorption coefficient and a third absorption peak at a third wavelength of light, wherein the first, second and third absorption layers have absorption levels that drop to nearly zero at the center of at least one neighboring absorber layer's absorption peak, wherein:
   the movable reflective layer and the absorber layer stack define a single, variable-sized gap therebetween, the size of the gap corresponding with a color of light reflected by the multi-state IMOD;
   the first absorber layer is disposed at a first position, within the absorber layer stack, corresponding to a null for the first wavelength of light that coincides with the first absorption peak;
   the second absorber layer is disposed at a second position, within the absorber layer stack, corresponding to a null for the second wavelength of light that coincides with the second absorption peak;
   the third absorber layer is disposed at a third position, within the absorber layer stack, corresponding to a null for the third wavelength of light that coincides with the third absorption peak, the nulls for the first, second and third wavelengths of light corresponding to a resulting interference standing wave field intensity distribution when the gap corresponds to a white state of the multi-state IMOD.

2. The multi-state IMOD of claim 1, wherein at least one of the first absorber layer, the second absorber layer or the third absorber layer is formed of a metal nanoparticle thin film.

3. The multi-state IMOD of claim 1, wherein the first wavelength is shorter than the second wavelength and the second wavelength is shorter than the third wavelength.

4. The multi-state IMOD of claim 1, wherein the absorber stack includes a first substantially transparent layer disposed between the first absorber layer and the second absorber layer.

5. The multi-state IMOD of claim 4, wherein the absorber stack includes a second substantially transparent layer disposed between the second absorber layer and the third absorber layer.

6. The multi-state IMOD of claim 1, wherein the multi-state IMOD is configured to achieve a white state when the movable reflective layer is positioned approximately 100 nm or more from the absorber stack.

7. The multi-state IMOD of claim 1, wherein the multi-state IMOD is configured to achieve a white state when the movable reflective layer is positioned about 10 nm from the absorber stack.

8. The multi-state IMOD of claim 1, wherein the multi-state IMOD is a 3-state IMOD, a 5-state IMOD or an analog IMOD.

9. The multi-state IMOD of claim 1, wherein a white state of the multi-state IMOD is substantially similar to that of CIE Standard Illuminant D65.

10. The multi-state IMOD of claim 1, wherein the first wavelength corresponds to a blue color, the second wavelength corresponds to a green color and the third wavelength corresponds to a red color.

11. The multi-state IMOD of claim 1, wherein a white state of the multi-state IMOD is substantially similar to that of CIE Standard Illuminant D65.

12. The multi-state IMOD of claim 1, wherein the first wavelength corresponds to a blue color, the second wavelength corresponds to a green color and the third wavelength corresponds to a red color.

13. An apparatus that includes the multi-state IMOD of claim 1, further comprising:
   a display;
   a processor that is configured to communicate with the display, the processor being configured to process image data; and a memory device that is configured to communicate with the processor.

14. The apparatus of claim 13, further comprising:
a driver circuit configured to send at least one signal to the display; and
a controller configured to send at least a portion of the image data to the driver circuit.

15. The apparatus of claim 13, further comprising:
an image source module configured to send the image data to the processor, wherein the image source module includes at least one of a receiver, transceiver, and transmitter.

16. The apparatus of claim 13, further comprising:
an input device configured to receive input data and to communicate the input data to the processor.

17. A multi-state interferometric modulator (IMOD), comprising:
a movable reflective layer; and
an absorber layer stack having a first absorber layer disposed at a first position, within the absorber layer stack, corresponding to a null for a first wavelength of light that coincides with a first absorption peak of the first absorber layer, a second absorber layer disposed at a second position, within the absorber layer stack, corresponding to a null for a second wavelength of light that coincides with a second absorption peak of the second absorber layer, and a third absorber layer disposed at a third position, within the absorber layer stack, corresponding to a null for a third wavelength of light that coincides with a third absorption peak of the third absorber layer, wherein:
the movable reflective layer and the absorber layer stack define a single, variable-sized gap therebetween, the size of the gap corresponding with a color of light reflected by the multi-state IMOD; and
the nulls for the first, second and third wavelengths of light correspond to a resulting interference standing wave field intensity distribution when the movable reflective layer is actuated to a white state.

18. The multi-state IMOD of claim 17, wherein the first, second and third absorption layers have absorption levels that drop to nearly zero at the center of at least one neighboring absorber layer's absorption peak.

19. The multi-state IMOD of claim 17, wherein at least one of the first absorber layer, the second absorber layer or the third absorber layer is formed of a metal nanoparticle thin film.

20. The multi-state IMOD of claim 17, wherein the first wavelength is shorter than the second wavelength and the second wavelength is shorter than the third wavelength.

21. The multi-state IMOD of claim 17, wherein the multi-state IMOD is a 3-state IMOD, a 5-state IMOD or an analog IMOD.

22. A multi-state interferometric modulator (IMOD), comprising:
movable reflective means;
first absorber means for producing a first absorption peak at a first wavelength;
second absorber means for producing a second absorption peak at a second wavelength; and
third absorber means for producing a third absorption peak at a third wavelength, wherein each of the first, second and third absorber means have absorption levels that drop to nearly zero at the center of an absorption peak of at least one neighboring absorber means, wherein:
the first absorber means, the second absorber means and the third absorber means form an absorber stack;
the movable reflective means and the absorber layer stack define a single, variable-sized gap therebetween, the size of the gap corresponding with a color of light reflected by the multi-state IMOD;
the first absorber means is disposed at a first position, within the absorber layer stack, corresponding to a null for the first wavelength of light that coincides with the first absorption peak;
the second absorber means is disposed at a second position, within the absorber layer stack, corresponding to a null for the second wavelength of light that coincides with the second absorption peak;
the third absorber means is disposed at a third position, within the absorber layer stack, corresponding to a null for the third wavelength of light that coincides with the third absorption peak, the nulls for the first, second and third wavelengths of light corresponding to a resulting interference standing wave field intensity distribution when the gap corresponds to a white state of the multi-state IMOD.

23. The multi-state IMOD of claim 22, wherein at least one of the first absorber means, the second absorber means or the third absorber means is formed of a metal nanoparticle thin film.

24. The multi-state IMOD of claim 22, wherein the first wavelength is shorter than the second wavelength and the second wavelength is shorter than the third wavelength.

25. The multi-state IMOD of claim 22, wherein the multi-state IMOD is a 3-state IMOD, a 5-state IMOD or an analog IMOD.

26. A method, comprising:
disposing a first absorber layer of a multi-state interferometric modulator (IMOD) at a first position, within an absorber stack, corresponding to a null for a first wavelength of light that coincides with a first absorption peak of the first absorber layer;
disposing a second absorber layer at a second position, within the absorber stack, corresponding to a null for a second wavelength of light that coincides with a second absorption peak of the second absorber layer;
disposing a third absorber layer at a third position, within the absorber stack, corresponding to a null for a third wavelength of light that coincides with a third absorption peak of the third absorber layer, wherein each of the first, second and third absorber layers have absorption levels that drop to nearly zero at the center of a neighboring absorber layer's absorption peak; and
configuring a reflective layer of the multi-state IMOD for moving to various positions relative to the absorber stack, each position corresponding to a color reflected from the multi-state IMOD, wherein the nulls for the first, second and third wavelengths of light correspond to a resulting interference standing wave field intensity distribution when the reflective layer is moved to a position that corresponds to a white state of the multi-state IMOD.

27. The method of claim 26, further including forming at least one of the first absorber layer, the second absorber layer or the third absorber layer of a metal nanoparticle thin film.

28. The method of claim 26, wherein the first wavelength is shorter than the second wavelength and the second wavelength is shorter than the third wavelength.

29. The method of claim 26, wherein the reflective layer is configured for moving to a least three positions relative to the absorber stack.

* * * * *